United States Patent [19]
Brockel et al.

[11] Patent Number: 5,794,128
[45] Date of Patent: Aug. 11, 1998

[54] APPARATUS AND PROCESSES FOR REALISTIC SIMULATION OF WIRELESS INFORMATION TRANSPORT SYSTEMS

[75] Inventors: Kenneth H. Brockel, Neptune; Victor J. Procopio, Jr., Oceanport; Paul A. Major, Berkeley Heights; Arvids Vigants, Red Bank; Joseph Pasirstein, Parisippany; Richard W. Wood, Freehold, all of N.J.

[73] Assignee: The United States of America as represented by the Secretary of the Army, Washington, D.C.

[21] Appl. No.: 530,921

[22] Filed: Sep. 20, 1995

[51] Int. Cl.$^6$ .................................................. H04B 17/00
[52] U.S. Cl. ........................ 455/67.1; 455/52.3; 455/65; 364/578
[58] Field of Search ................... 455/67.1, 67.3, 455/67.6, 52.3, 65, 63, 67.7; 395/500; 364/578, 514 R, 514 C

[56] References Cited

U.S. PATENT DOCUMENTS

| | | | |
|---|---|---|---|
| 5,062,148 | 10/1991 | Edwards | 455/52.3 |
| 5,355,519 | 10/1994 | Hasegawa | 455/67.7 |
| 5,465,393 | 11/1995 | Frostom et al. | 455/67.6 |
| 5,561,841 | 10/1996 | Markus | 455/33.1 |
| 5,596,570 | 1/1997 | Soliman | 455/67.3 |

OTHER PUBLICATIONS

Brockel et al., "Communications Realism for Network Simulation", MILCON '95, Universal Communications, Conference Record, IEEE, 1995, pp. 484–490 vol. 2 of 3 vol. xxxvii + 1291 pp 7 refs. 1995.

*Primary Examiner*—Andrew Faile
*Assistant Examiner*—Aung S. Moe
*Attorney, Agent, or Firm*—Michael Zelenka; George B. Tereschuk

[57] ABSTRACT

Realistic models and processes for simulation of wireless information transport systems are provided which replicate all time and frequency dynamics effects on stationary and mobile communications systems. The preferred embodiment is a realsitic modeling apparatus for simulation of wireless information transport systems comprising a data entry module, a communications traffic selection module, a driver database, and voice and data input modules furnishing a simulation input to a network simulation module. The network simulation module having communications realism effects, a DIS structure, a channel error-burst model to transmit random errors, and a multipath modeling module to integrate deterministic and stochastic effects. The multipath modeling module, having a digital radio model and a Terrain-Integrated Rough Earth Model, influences the simulation inputs forming a multipath output, which is adjusted by voice and data inputs to provide a realistic, real-time simulation output signal to a display module portraying the simulated communications network and link connectivity. The network simulation module, channel error-burst model and multipath modeling module comprise a number of computer programs. A method for realistic simulation of wireless information transport systems in real-time utilizing modeling techniques and computer programs is also disclosed.

32 Claims, 14 Drawing Sheets

POOR COMMUNICATIONS

GOOD COMMUNICATIONS

APPARATUS AND PROCESSES FOR REALISTIC SIMULATION OF WIRELESS INFORMATION TRANSPORT SYSTEMS

GOVERNMENT INTEREST

The invention described herein may be manufactured, used and licensed by or for the Government of the United States of America without the payment to us of any royalties thereon.

BACKGROUND OF THE INVENTION

1. Field of the Invention

This invention relates to the field of radio communications and information transport systems. More particularly, this invention relates to realistic models and processes for simulation of wireless information transport systems able to replicate all of the time and frequency dynamics effects on a communications system in both stationary and mobile environments.

2. Description of the Prior Art

Military wargames scenarios traditionally assume a perfect communications system during the simulated operation. Since actual military communications are seldom flawless, in the field communications failures often adversely impact, or at the very least frustrate, the command and control capabilities of battlefield forces.

Communications problems on a digitized battlefield stem primarily from two sources. First, as forces move across the battlefield, radio connectivity between them varies dramatically and continually as a function of factors such as terrain, radio wave propagation, climate and radio-link capabilities. Such variations are generally either not accounted for in algorithms, models, methods or simulations of tactical communications or only included as averages. Voice communications users experience these variations as static, broken conversations or complete loss of contact. Data users see these variations in delayed or lost messages. Current models for terrain-associated propagation loss, such as the Terrain-Integrated Rough Earth Model ("TIREM") also do not account for rapid fluctuations in Received Signal Strength ("RSS") which cause error bursts in the data stream. Secondly, communications problems frequently involve network capacity limitations where many users rely upon common-user networks for command and control information which can often become congested, resulting in delayed or lost transmissions.

In light of such problems, those involved with communications realism modeling understand the importance of accurately recreating the communications environment that exists in the real world. One must replicate inherent communications network limitations, variations in connection quality and the interference from other communications such as radio/wireless communications which are a major contributor to connectivity problems on the digitized battlefield. Connectivity difficulties include signal blockage from terrain and severe time-varying reduction in signal strength caused by atmospheric layering, or ducting, and rapid signal fading caused by motion-related multipath effects. Therefore, realistic modeling of complex digital communications networks is needed.

Current training simulations and simulator systems do not readily allow an understanding of the effects of degraded communications on a system and on the battlefield. These systems are inadequate because the user is not influenced by the effects of communications realism when these systems exhibit perfect communications. FIG. 1 depicts a number of physical and environmental influences which can degrade communications quality. Those interested in training, development and system analysis of communications systems have long felt the need to better understand the effects of degraded communications on a system and on the battlefield.

Until now, real-time communications system modeling capability needed for tightly integrated and increasingly complex simulation was not available. Overall battlefield simulation can become too large for any one developer's simulation capability. Requirements analysis, system architecture design and field trials of systems all require real-time simulations which allow communications realism to play into large integrated systems in order to support analysis of the digital battlefield.

It has been long recognized that effective, real-time communications simulations must describe discrete events in real-time, as opposed to traditional statistical simulation approaches. Real-time simulation dictates determinism regarding the terrain between at least two moving platforms so that when platforms move and a hill comes between them, both the hill and its effects must be described accurately and deterministically. Dynamic multipath effects from a stochastic model that efficiently generates multipath events in real-time also need to be added to the deterministic effects, therefore a simulation approach is needed which integrates both deterministic and stochastic models.

Up to now there has been no modeling technique which advantageously integrates both deterministic and stochastic effects, to provide the much-needed realism in this area of communications on-the-move. Communicating on-the-move is crucial for the successful transfer of critical surveillance, intelligence and command and control information, particularly since future battlefields will involve extremely mobile, highly synchronized and dispersed forces with short duration command posts.

These digitized communications problems have created a need to assess the impact of communications realism and networks effects on communications networks. Real-time simulation provides that ability. To be useful, communications-effects models and simulations must faithfully, and in a timely manner, reproduce the radio connectivity and networks effects users will encounter in field conditions. Simulation users must encounter the same type of delays and difficulties in the simulator as one would actually experience during an operation on the same terrain. Neither current communications effects models nor real-time channel simulators provide that type of fidelity to actual conditions.

The present invention fulfills these long-recognized needs to make battlefield communications simulations more realistic without any of the disadvantages of previous communications simulators. This invention provides realistic apparatus and processes for simulation of wireless information transport systems comprising an interactive simulation system, having a number of network, radio and performance models and computer programs, provides communications realism modeling with a network simulation means. The network simulation means also implements the application of Distributed Interactive Simulation ("DIS") in this system. A multipath modeling means, known as Integrated Terrain-Environment Multipath Model ("ITEMM"), provides communications simulation in real-time for realism at the link level in large integrated systems, including both deterministic and stochastic effects, such as communications delays and lost reliability, and advantageously integrates both deterministic and stochastic effects to provide the necessary level of communications realism on a computer display means providing a pictorial representation of link connectivity to an operator.

The network simulation means known as the Real-Time Communications Network Simulator ("RTCNS") incorporates communications realism effects, including communications delays, loss of reliability and a plurality of random errors, into the system. The network simulation means simulates multiple simultaneous voice, data and imagery information exchanges at intranetwork and internetwork levels among stationary and moving platforms in a number of combinations that provide communications realism modeling. The network simulation means accurately recreates realistic communications environments, inherent communications network limitations, variations in connection quality and other communications and connectivity problems on the digitized battlefield caused by radio communications.

The apparatus and processes of the present invention also combine a deterministic path loss with a Terrain Integrated Rough-Earth Model ("TIREM") and discrete event simulation, such as multipath fading, as well as plug-and-play communications simulations mapped to an OSI protocol stock so that layered simulations when working together will provide mechanisms to stress higher level simulation.

The multipath modeling means known as ITEMM is a generic single-link radio model that provides detailed communications realism for network simulation by simulating communications environments and problems existing in the field such as signal fades from destructive multipath effects, error bursts and so on, as well as outputs on link performance and transmission delays.

The realistic models and processes for simulation of wireless information transport systems of the present invention can be used in a variety of applications for designing distributed experiments in different laboratories, or between laboratory and field experiments and the mixing of virtual and live experiments, in both military and commercial environments. Due to the unique nature of this invention, significant potential uses in both military and industrial markets seem likely.

Also disclosed are methods of interactively simulating communications effects on communications systems in real-time comprising a number of modeling techniques and computer programs, simulating a communications network to provide communications realism modeling and effects, real-time multipath modeling for realism in large integrated systems, generating a plurality of interference signals and displaying a pictorial representation of link connectivity to an operator.

Examples of communications devices which utilize modeling techniques may be found in the following pending U.S. patent applications:

CECOM Docket No. 4796, Brockel et. al. "Method of Establishing Line of Sight Propagation," U.S. patent Ser. No. 07/952,448, which has been partially assigned to the same assignee.

CECOM Docket No. 4907, Brockel et. al. "Apparatus and Method of Managing a Communications Network," U.S. patent Ser. No. 08/489,598, which has been partially assigned to the same assignee.

SUMMARY OF THE INVENTION

It is an object of this invention to provide a communications-effects model and interactive simulation device which faithfully reproduces field conditions in terms of radio connectivity and networks effects.

It is another object of the present invention to provide a real-time, interactive communications simulation system utilizing real-time modeling, a network simulation means, a multipath modeling means, a Distributed Interactive Simulation ("DIS") interface, a transmitter means, a plurality of interference signals, a plurality of error bursts for time-varying communications channels and a number of computer programs. The system receives input on a number of variables such as radio attributes, platform environment, radio wave propagation dynamics, noise variability and countermeasures on a real-time basis, can replicate the effects of those variables on either a digital voice or data bit stream and provides a pictorial representation of link connectivity on a computer display means. The DIS interface allows multiple simulators to interact in a common simulated environment over a widely distributed network. In DIS systems, each simulator or simulated platform is an entity, and interactions among the entities are communicated through a set of standard Protocol Data Units ("PDU's") which convey essential information about shared events.

It is a further object of the present invention to provide a method of interactively simulating communications effects on communications systems in real-time comprising a number of modeling techniques and computer programs, simulating a communications network to provide communications realism modeling and effects, real-time multipath modeling for realism in large integrated systems, generating a plurality of interference signals and displaying a pictorial representation of link connectivity to an operator.

It is still a further object of this invention to use the processes and methods of the present invention as advanced mission planning tools embedded in either multi-mode, multi-band radios or stand alone planning tools supporting the planning of high capacity wireless data transport systems.

It is yet another object of this invention to use the processes and methods of the present invention as protocol drivers for real-time, adaptive, waveform, spectrum and error coding drivers for wireless transport systems such as data radios.

To attain these and other objects, the present invention contemplates a real-time, interactive communications simulation apparatus, as depicted on the FIG. 2 conceptual diagram, comprising a number of network, radio and performance models and computer programs, a network simulation means known as the Real-Time Communications Network Simulator ("RTCNS") and a multipath modeling means, known as Integrated Terrain-Environment Multipath Model ("ITEMM"), which advantageously, faithfully and in a timely manner reproduces the radio connectivity and networks effects encountered in field conditions, without any of the disadvantages of less realistic prior communications simulation systems.

In the preferred embodiment, the present invention contemplates an interactive simulation apparatus, comprising a data entry means for inputting a plurality of network performance characteristics, a plurality of simulation inputs, a network simulation means for communications realism modeling that includes a plurality of communications realism effects, a channel error-burst model to transmit a plurality of random errors, and a multipath modeling means. The multipath modeling means advantageously integrates both deterministic and stochastic effects to provide the necessary level of real-time, realistic and interactive communications simulation and further comprises a digital radio model and a Terrain-Integrated Rough Earth Model ("TIREM"). The network simulation means includes a means for simulating radio attributes, a means for simulating countermeasure signals, a means for simulating platform environment, a propagation variability means and a noise variability means, and having access to the multipath modeling means, influences the plurality of simulation inputs to form a multipath output. The multipath output is adjusted by voice and data inputs to provide a realistic, real-time simulation output signal to a display means. The display means provides a pictorial representation of link connectivity to an operator. The network simulation means, channel error-burst model and multipath modeling means are provided in a number of computer programs.

The present invention also contemplates a method of for realistic simulation of wireless information transport systems in real-time utilizing a number of modeling techniques and computer programs, comprising the steps of entering data inputs and performance characteristics into a communications traffic selection means, transmitting a driver database output to a network data input module connected to a network simulation means, providing voice and data information as a plurality of simulation inputs to the network simulation means, simulating a plurality of stationary and moving digitized communications platforms and nodes, the network simulation means having access to a multipath modeling means, the multipath modeling means having an ITEMM software program and a digital radio model, converting the plurality of simulation inputs within the network simulation means into a multipath output, adjusting the multipath output, combining the adjusted multipath output with voice and data inputs and then transmitting a realistic, real-time simulation output signal to a display means thereby displaying a pictorial representation of link connectivity to an operator.

Table I provides error burst statistics.

Table II is depicts the results of an experiment testing the effectiveness of very-high frequency (VHF) and ultra-high frequency (UHF) radios on moving vehicles under selected battlefield scenarios.

Table III depicts the results of a second experiment analyzing message failure rates for moving VHF radios traveling over difficult terrain at a 15 mph vehicle speed, 50-MHz radio frequency and 4800-bps rate, using Golay coding.

Table IV depicts sample results of the second experiment analyzing message failure rates.

The term "node" should be considered to refer to a single communications center from which information either originates, terminates or is passed through (e.g., retransmitted). A node may be composed of a single radio, cellular phone, repeater, switch or computer terminal and any combination of gateways or routes, bridges and computer terminals. A node is identified with a unique designation.

The term "platform" should be considered to refer to a physical location for a given node. A platform can be a stationary location with a permanent geographical location (i.e. longitude, latitude and elevation) or a location capable of moving in a multidimensional space at a given velocity, or geographic trajectory. For example, a soldier, a vehicle and a helicopter, each having a radio are considered platforms. A platform may contain any number of nodes and will be designated with a unique identification.

The exact nature of this invention as well as other objects and advantages thereof will be readily apparent from consideration of the following specification relating to the annexed drawings.

DETAILED DESCRIPTION OF THE INVENTION

Figure 4:
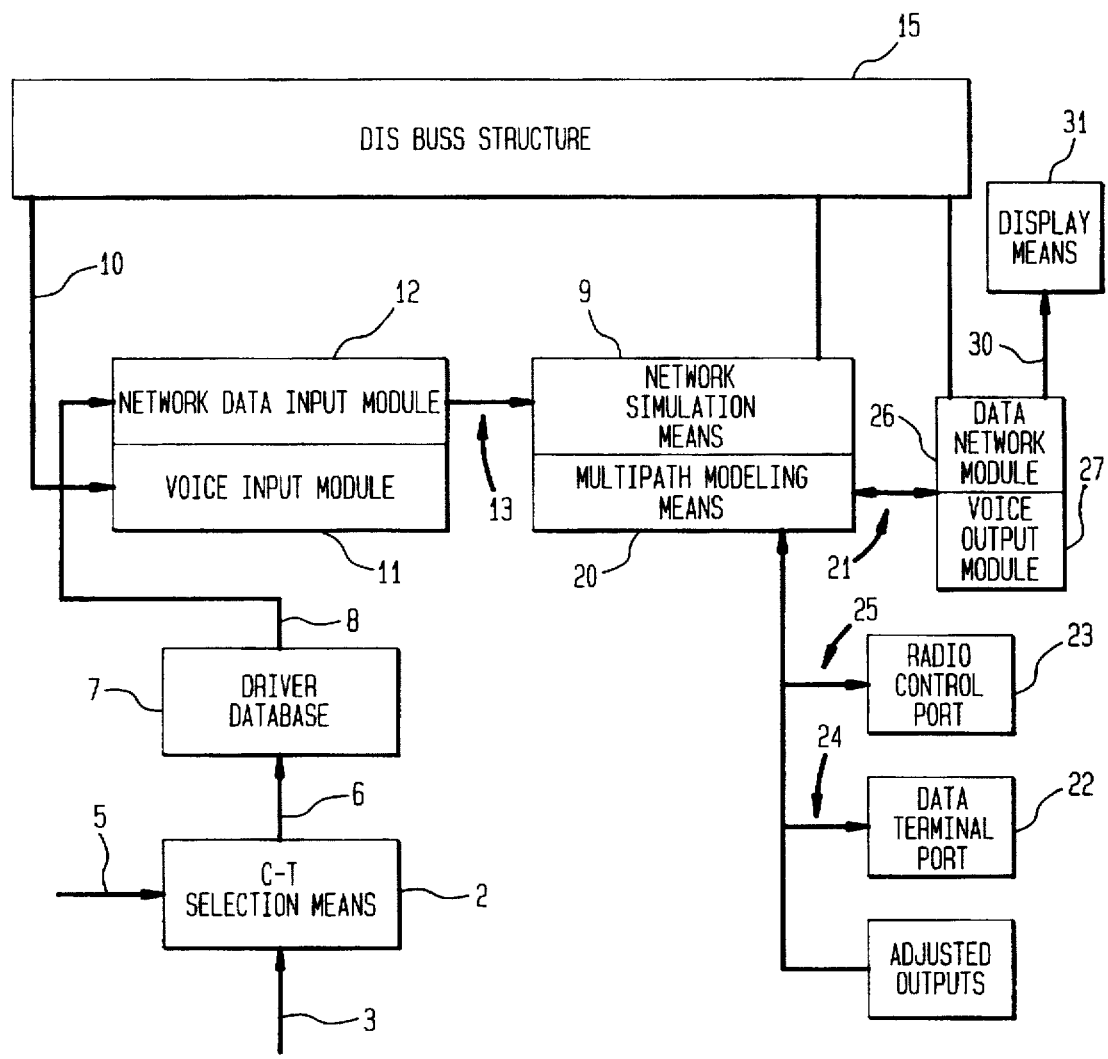
FIG. 4 is a flow diagram illustrating the preferred embodiment of the invention.

FIG. 4 is a flow diagram of the realistic modeling apparatus for simulation of wireless information transport systems of the present invention depicting a plurality of data inputs being furnished by a data loading means to a communications traffic selection means 2, said selection means 2, having a plurality of command databases, a plurality of mission thread databases and a traffic scenario database, being loaded from a plurality of servers, indicated by arrow 3, and having an all network topology allowing an operator to make a plurality of communications protocol parameter input selections, indicated by arrow 5. After the operator makes said plurality of communications protocol parameter input selections, arrow 5, a communications traffic selection database output, indicated by arrow 6, is provided to a driver database 7, said driver database 7 being pre-loaded and multi-protocol capable, converts a plurality of historical or statistical events, such as past weather experience, into a plurality of statistical events included as a portion of a driver output, indicated by arrow 8, transmitting data only to a network data input module 12 connected to a network simulation means 9. The operator or other systems also provide a voice input, indicated by arrow 10, to a voice input module 11. Said network simulation means 9, having a plurality of platforms, being rule-driven and multi-network capable, receives a plurality of simulation inputs, indicated by arrow 13. Said network simulation means 9, having access to a multipath modeling means 20.

Said multipath modeling means 20 having an ITEMM software program to simulate communications effects, a digital radio model and a channel error-burst model focuses on messages being simulated, within said apparatus. Said ITEMM software program of the multipath modeling means 20 provides a plurality of realistic communications effects to influence said plurality of simulation inputs, arrow 13. Said ITEMM software program can simulate a plurality of distributive effects, a plurality of terrain effects, a plurality of path loss effects, a plurality of environmental factors, a plurality of propagation dynamics and a plurality of jammers. Said digital radio model, having a narrow band transport means and a high band transport means. A data terminal port 22 and radio control port 23 provide data and voice adjusted outputs, indicated by arrows 24 and 25, respectively, to said network simulation means 9. Said network simulation means 9 cooperating with said multipath modeling means 20 converts said plurality of simulation inputs, arrow 13, into a multipath output, indicated by arrow 21, to a data network module 26 and a voice output module 27 which are then combined into a real-time, simulation output signal, indicated by arrow 30, displayed on a display means 31. Said simulation output signal 30 can also be transmitted to other simulation platforms engaging in a simulation exercise.

Said network simulation means 9, said multipath modeling means 20 and said channel error-burst model, being key aspects of the present invention will now be described in further detail.

Said network simulation means 9, also known as the Real-Time Communications Network Simulator ("RTCNS"), simulates a plurality of simultaneous voice, data and imagery information exchanges at intranetwork and internetwork levels among stationary and moving platforms, combining a plurality of circuit, packet and asynchronous transfer mode switches, net radios and so on, in order to provide communications realism modeling. The modeling accomplished by said network simulation means 9 accurately recreates real world communications environments, along with inherent communications network limitations, variations in connection quality and other communications and connectivity problems on the digitized battlefield caused by radio communications. After the operator makes said plurality of communications protocol parameter input selections, arrow 5, to define the parameters of the simulation exercise, said network simulation means 9 permits the operator to modify said plurality of database outputs based on the various scenarios that may be encountered and is plug-and-play compatible. Said network simulation means 9 includes a plurality of stationary platforms and a plurality of moving platforms which model and simulate homogeneous and heterogeneous combinations of circuit, packet and ATM switches, net radios, soldier radios, packet/multimedia radios, cellular and personal communications systems, broadcast satellite radios and near-term digital radios reflecting intranetwork and internetwork communications and related overhead traffic. Said network simulation means 9 is configured to operate at three different speeds: real-time, faster than real-time, or accelerated mode, and near real-time to allow said operators greater flexibility depending upon whether the apparatus is in a mission or training mode.

Figure 5:
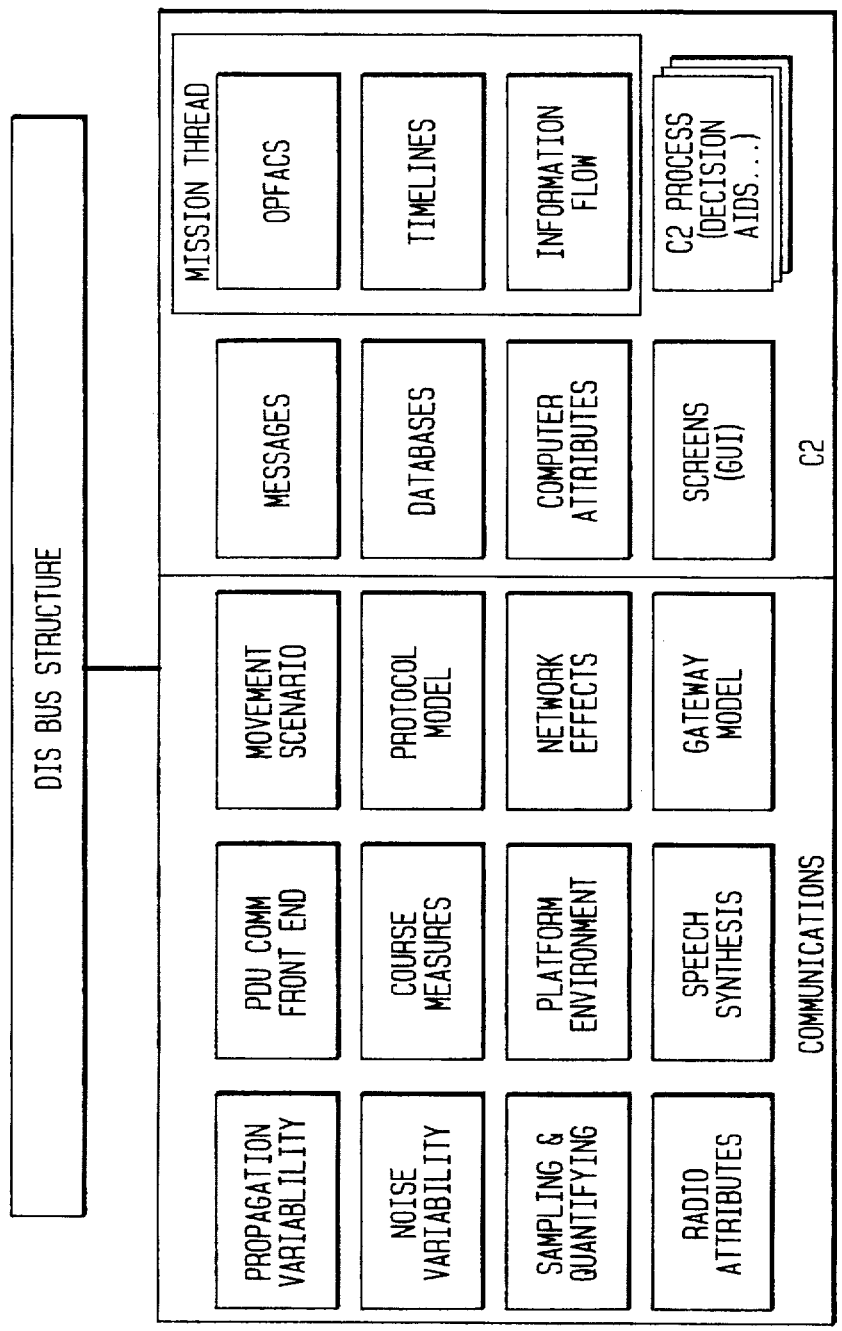
FIG. 5 is a block diagram illustrating how a command, control and communications model is integrated into DIS.

In operation of said network simulation means 9, simulation of a plurality of protocols at each layer may be selected by the operator, including a plurality of internet protocol services and a plurality of networking capabilities such as routing, relaying, address-resolution and internetworking. Said network simulation means 9, being plug-and-play compatible, affords the operator greater flexibility in changing said plurality of database outputs during a simulation exercise. A data link layer of said network simulation means 9 provides capabilities relating to functions such as dataflow control, roving host configuration protocol and error-correction and recovery. The operator may also select from a plurality of error-correction codes. Said network simulation means 9, having a Distributed Interactive Simulation ("DIS") Interface structure 15 and a DIS network complies with a plurality of underlying DIS performance requirements and protocols permitting interoperability among all operators within a simulation exercise. FIG. 5 is a block diagram illustrating how a command, control and communications model is integrated into DIS.

Said DIS Interface structure 15 conforms to evolving standards governing the interoperability of distributed simulation parameters on the network, including latency constraints, allowing interaction among simulators at different locations. In operation, a plurality of radio-based voice, audio and data communications PDU's are sent across said DIS network to each station involved in a simulation allowing communications-effects simulation modules to be integrated with the simulations at the entities receiving said plurality of PDU's. DIS version 2.0 is the current standard which is also compatible with IEEE Standard 1278 and is included within said network simulation means 9.

Said network simulation means 9 provides a plurality of simulation outputs, including network quality, behavior, grade of service, message transmission delays, network-access delays due to transmission collisions, quantity of messages transmitted, retransmitted or lost, network/link utilization, received signal power curves, intranetwork and internetwork routing data and a graphic display on said computer display means 31. A plurality of simulation software components of said network simulation means 9 are streamlined and compact in order to provide the required fidelity and meet real-time computation constraints. A simulation event scheduler coordinates and synchronizes the execution of modules in order to help reduce the computation load. Further, based upon analysis of processing time needed to determine communications degradation as a function of vehicle velocity, terrain fidelity and the dynamics of over-the-air links, a processing time of 500 microseconds performs byte-to-byte communications effects processing on a 16 kilobits per second bit stream carried in said incoming PDU's. However, this processing time allocation does not include delays needed to format or send a plurality of outgoing communications effects PDU's to said DIS network. The computer software is modular in order to accommodate a mix-and-match modeling environment.

Said network simulation means 9 provides realistic communications effects for both stationary and on-the-move voice, data and imagery communications by determining the impact of deterministic terrain propagation loss coupled with the presence of stochastic multipath fading, including terrain error bursts, fading error bursts in both fixed and hopping frequencies, combined error bursts and error burst impact with countermeasures.

Figure 6:
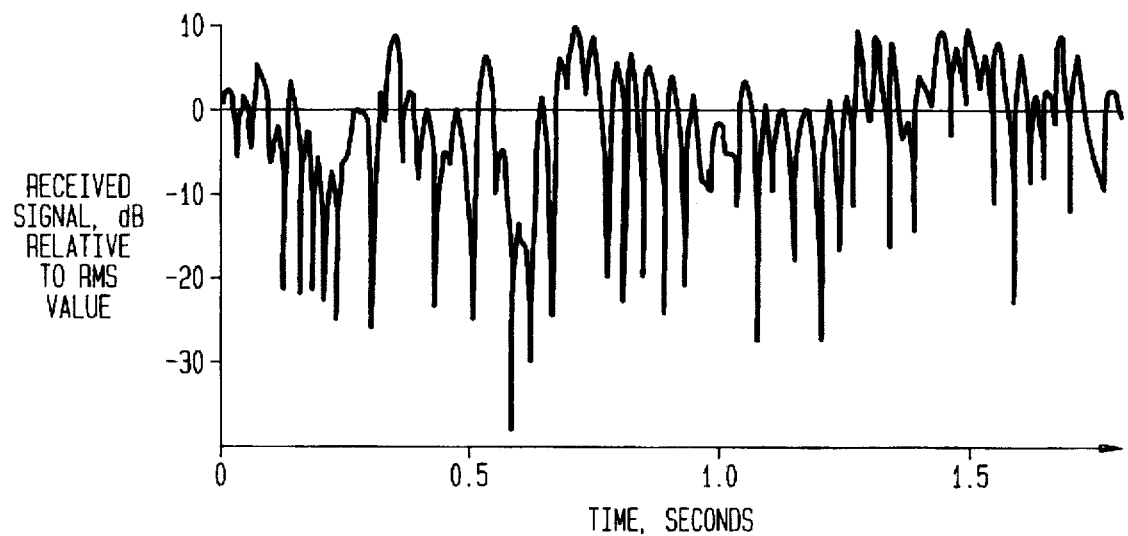
FIG. 6 is a graph depicting on-the-move signal variation as it relates to error bursts.
Figure 7:
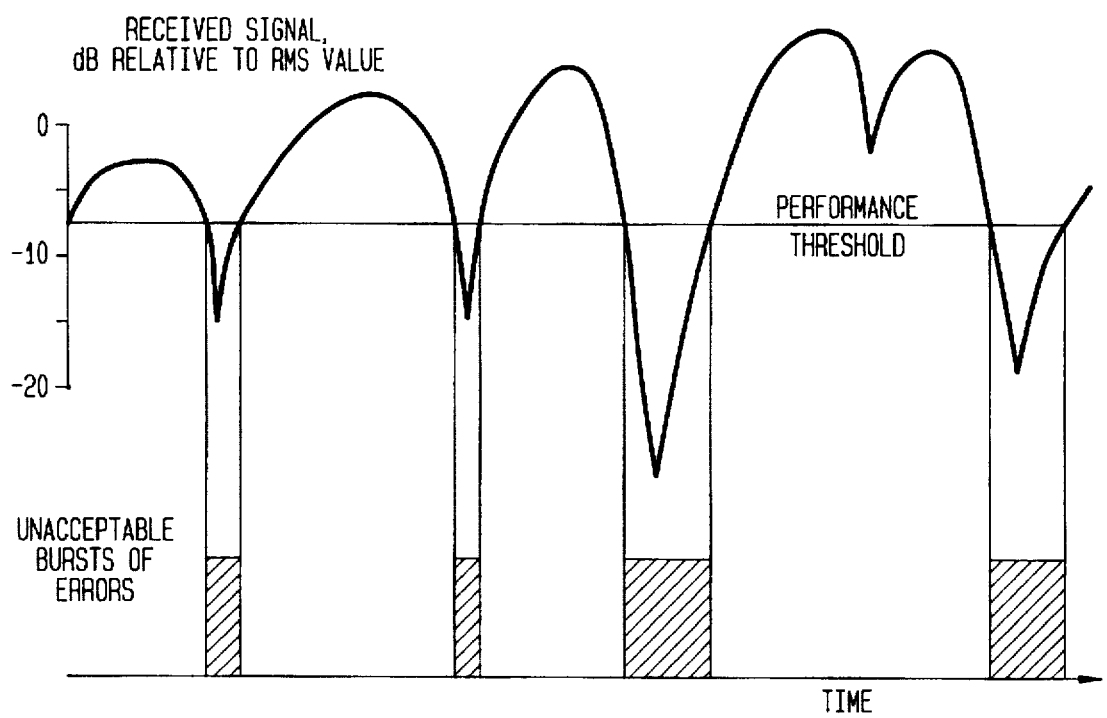
FIG. 7 is a chart depicting on-the-move radio signal characteristics.
Figure 8:
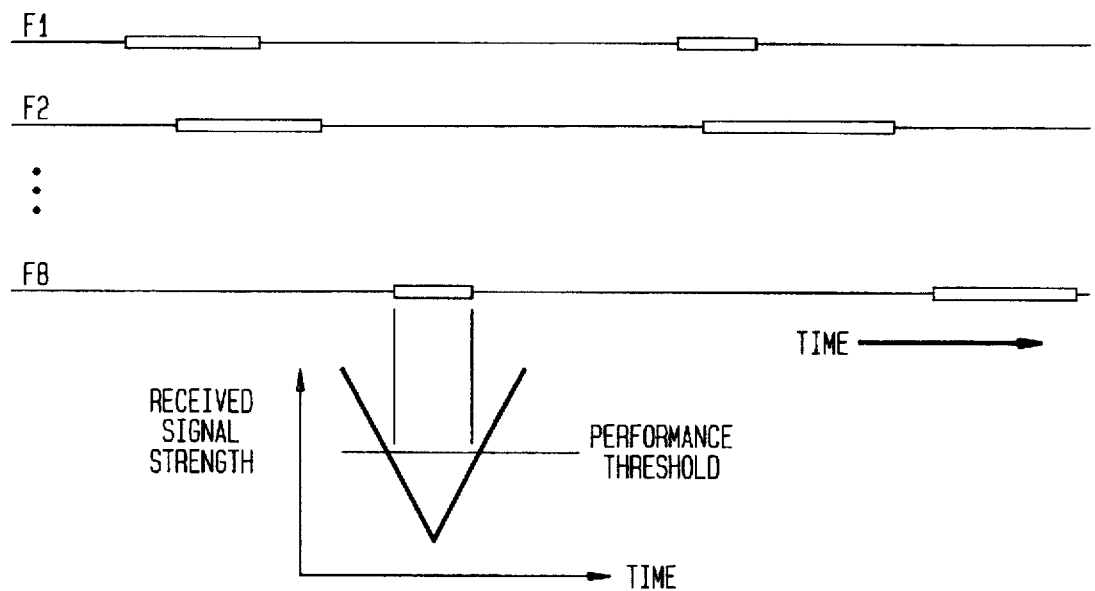
FIG. 8 is a graph illustrating the correlation between Frequency Hopping dwells.

Referring now to FIG. 6, a graph depicting on-the-move signal variation as it relates to error bursts is provided. FIG. 7 is a chart depicting on-the-move radio signal characteristics, while FIG. 8 is a graph illustrating the correlation between Frequency Hopping dwells. In both terrain error bursts and the fading process, link fade margins must be calculated by said network simulation means 9. Since it is possible for both the source and the sink to move during communications, the fade margin may need to be calculated more than once (i.e., FadeMargin). The number of calculations depends on the operator's fidelity preference along with the duration of the call or message, the speed that the source or sink is travelling and the fidelity of the terrain database used, represented by the variable MinDistance, which specifies how far a communicator can move without severely changing the path loss value. The number of times that the fade margin must be calculated over the duration of the message or call, L, is determined as follows:

mspeed=MAX|source.Speed, sink.Speed|; represented in m/s $$L = ROUNDUP \left[ \frac{mspeed \cdot \left( \frac{msg.OverallSize}{data.rate} \right)}{MinDistance} \right]$$

The ROUNDUP[ ] function returns a value of L as an integer. The fade margin is determined from a plurality of user specified receiver performance thresholds, based on the higher value of either an ambient noise floor or system sensitivity, and a calculated receiver RMS received power level, which is based on dynamic path loss and both user-specified transmission power and antenna gains. Fade margin is calculated as:

FadeMargin=RxInpUt-RxThreshold; N=1 to L where

RxInput=TxPower+TxAntGain+RxAntGain−TiremLoss
RxThreshold=MAX[ThermalNoise, sink.NoiseFloor]
ThermalNoise=−174+10 log$_{10}$ [Bandwidth];

and TxPower, TxAntGain, RxAntGain, sink.NoiseFloor and Bandwidth are among a plurality of user-specified radio parameters. To compute TiremLoss, a path profile must be generated between the source and the sink and said TIREM software program exercised.

In order to determine the impact of terrain on the call or message, a plurality of terrain error bursts, ("terrain_EB") are generated whenever said fade margin dips below 0 dB. Those positions of said plurality of terrain error bursts relevant to the beginning of the call or message are stored in structure:

$$TEBi; \text{ where } i = 1 \text{ through } \frac{\text{number of bursts}}{2}$$

for subsequent countermeasure processing and overall determination of whether the communications were successfully received. Thus for each FadeMargin (1 to L):

If FadeMargin≦0 & terrain_EBflag not set,
note start of terrain_EB:
TEBi=BITPOSITION[SegmentN]=

$$N \cdot \left[ \frac{MinDistance}{mspeed} \right] \cdot TransRate + TEBi$$

where TransRate is a among a plurality of user-specified radio parameters, and BITPOSITION[ ] is a function that returns the bit number in relation to a passed value.
terrain_EBflag=start.
If FadeMargin>0 & terrain_EBflag=start, note end of terrain_EB:

$$TEBi = \left[ \frac{MinDistance}{mspeed} \right] \cdot TransRate + TEB(i-1)$$

terrain_EBflag=end.

A plurality of error-burst generators of said network simulation means 9 determine the presence, or arrival, and duration of a deep fade, which is a fade below said performance threshold, during the simulation using a plurality of exponential distributions with a mean as a function of frequency, relative velocity and fade margin. Said Received Signal Strength ("RSS") for a channel in a multipath environment is described by Rayleigh fading amplitude statistics. This fading increases bit errors caused by poor Signal-to-Noise Ratio ("SNR"). The Rayleigh fading process has been characterized for fixed and frequency-hopping (FH) signals and generic models have been developed for determining the fade depth as functions of a plurality of correlation coefficients that could be validated.

Relative velocity, v, of the source with respect to the sink is needed to calculate the fading effects. This is computed using a plurality of user-specified vehicle parameters, breaking each vehicle speed into x and y axis movements. Fading events are modeled as a function of rate and duration. The average fade rate is calculated as:

$$n(r) = \frac{\sqrt{2\pi}}{\lambda} vre^{-r^2}$$

and the average fade duration is calculated as:

$$t(r) = \frac{\lambda(e^{r^2} - 1)}{\sqrt{2\pi} \cdot vr} = \frac{1 - e^{-r^2}}{n(r)}$$

where r is the fade depth, v is the vehicle velocity and λ is the wavelength derived from the radio frequency. Fade depth, r, is derived from the dB fade margin as:

$$r = 10^{\frac{-FadeMargin}{20}}$$

and is expressed as voltage normalized to RMS. Modeling of the fading process for fixed frequency and frequency-hopping transmissions is discussed further below.

To determine the impact of multipath fading on the call or message, a plurality of fading error bursts, fade_EB, are generated based on the average fade rate and average fade duration. Those positions of these bursts relevant to the beginning of the call or message are stored, so that:

$$FEBi; i = 1 \text{ through } \frac{\text{number of bursts}}{2}$$

for subsequent countermeasure processing and overall determination of whether the communications was successfully received. An initial fade_EB is first calculated by determining the time to the next fade_EB, adding it to the current time to get an end_of_fade_EB time, calculating the duration of the fade_EB, and subtracting it from end_of_fade_EB to get the start time of fade_EB, as follows:

calculate n(r) using Fademargin1
time_to_next_fade_EB=EXPONENTIALLY-DISTRIBUTE[1/n(r)] where EXPONENTIALLY-DISTRIBUTE[ ] is a function that returns an exponentially-distributed random variable with mean of the passed value, so that EXPONENTIALLY-DISTRIBUTE|X|=−X·log$_e$

|uniform random number from 0 to 1| end_of_fade_EB=Tmsg+time_to_next_fade_EB, where Tmsg is start of message time calculate t(r) using Fademargin1 actual_fade_duration=EXPONENTIALLY-DISTRIBUTE|t(r)| start_of_fade_EB=end_of_fade_EB −actual_fade_duration.

If this initial fade_EB ends before the call or message starts, said network simulation means 9 will continue computing the initial fade_EB as follows:

while end of initial fade_EB time is less than the start time, keep generating new fade_EB's:
    time_to_next_fade_EB=EXPONENTIALLY-DISTRIBUTE| 1/n(r)|
    start_of_fade_EB=last start_of_fade_EB+time_to_next_fade_EB
    actual_fade_duration=EXPONENTIALLY-DISTRIBUTE|t(r)|
    end_of_fade_EB=new start_of_fade_EB+actual_fade_duration Said network simulation means 9 stores bit positions related to start and end times for initial fade_EB in FEB1 and FEB2. If start_of_fade_EB occurs prior to message start time, set FEB1 to BITPOSITION [message start]. A plurality of subsequent fade_EB's must be generated until the end of the message is reached, using the proper FadeMargin value at the appropriate time. Thus, loop:

If end-of-fade_EB comes before time at the next fade margin (i.e., SegmentN+1)
    keep same n(r) and t(r) values (associated with FadeMargin) when calculating next start/end of fade_EB's
  else increment N and use next FadeMargin value to calculate new n(r) and t(r) values:
    time_to_next_fade_EB=EXPONENTIALLY-DISTRIBUTE| 1/n(r)|
    start_of_fade-EB=last start_of_fade_EB+time_to_next_fade-EB
    increment N and set FEBN=start_of_fade EB·TransRate
    actual_fade_duration=EXPONENTIALLY-DISTRIBUTE[t(r)]
    end_of_fade_EB=start_of_fade_EB+actual_fade_duration
    increment N and set FEBN=end_of_fade_EB·TransRate
  if the last end_of_fade_EB occurs after the end of the message, then:
    FEBN=BITPOSITION[message end]

A different methodology is used for the frequency hopping ("FH") mode because of the lack of correlation between the multipath fading for one FH dwell and another dwell. Referring now to FIG. 8, a graph is provided to illustrate the correlation between FH dwells. The correlation between FH dwells was analyzed using a sliding window analysis which examined what correlation exists between HOPi and subsequent HOPi+1, . . . , HOPn. The envelope correlation coefficient is defined as a function of frequency and time separation and was calculated, plotted and examined to determined at what hop rates and frequency shifts correlation would be a factor. For the slow FH link transmission modes, the coherence bandwidth of multipath fading is generally greater than the modulated spectrum at each frequency dwell. The fading can thus be considered as flat or non-frequency selective. For the vehicle speeds under consideration the fading varies slowly compared to the channel symbol rate. For links operating at marginal performance ranges, the primary effects of fades on a particular hop frequency are correlated burst symbol errors of durations comparable to a frequency dwell interval. Correlated fades can occur over a number of sequential dwell intervals depending on the frequency and time separation. Interfade intervals will have comparable durations but will generally exhibit independent error patterns.

An error control block (ECB) is based on the codeword size and the interleaver depth and consists of $N_s$ codewords of n symbols in length. The interleaver process bit interleaves the n×$N_s$ codewords in such a pattern that no two symbols from the same codeword will be transmitted in the same FH dwell interval. The span of the number of dwell intervals over which the symbols of any single codeword are spread is a function of the FH rate, and the range of burst error time durations that the link design is intended to counter. The symbol redistribution patterns to be modeled and simulated may be deterministic or pseudo-random. The FH process includes selection of a frequency from the allocated frequency hopset for each of the sequence of frequency dwell intervals required to transmit the interleaved n×$N_s$ symbols in said ECB. The frequency selection mechanisms that must be modeled and simulated range from deterministic, to independent pseudo random, to conditional time dispersed frequency selection.

Since the hop rate is much smaller than the bit rate, the effects of Rayleigh fading in different channels can be treated as independent events, if, for example, for the 30-MHz-to-88-MHz band-dwell-time and frequency separations are separated by greater than 100 ms and 800 kHz, respectively. This simplifies the simulation and eliminates the need for correlation between adjacent hops. The number of hops $N_h$ required to transmit the n×$N_S$ codewords in the ECB is given by the ratio:

$$n \cdot \frac{N_a}{N_h}$$

FH algorithms use the ratio of burst duration-to-fade rate to determine the probability of a dwell being in a fade, as follows:

$$P = \frac{t(r) \cdot n(r)}{1 + t(r) \cdot n(r)}$$

Similar to the fixed frequency mode, the n(r) and t(r) are kept constant until the fade margin changes at the next interval, which is SegmentN. The fade margin change occurs whenever a vehicle moves significantly enough. At the beginning of each dwell time, a uniformly-distributed random number (between 0 and 1) is generated and compared to the ratio to determine if a particular dwell is good or bad. For example, if P equaled 0.75, and the random number generated equaled 0.4, then it would be assumed that the particular dwell was in fact in a deep fade.

The combination of said plurality of terrain error bursts and said plurality of fading error bursts, which are stored in EB structure, are then evaluated against a plurality of selected countermeasures. The resulting bit errors are overlaid on communications segments to determine the overall impact.

The error bursts are analyzed to determine the impact on the Sync field and transmission header field, as applicable to the user-selected protocol, and data payload field.

For sync field processing, said network simulation means 9 determines the applicable error bits by counting number of errored bits between start and end bit positions of the defined field. Next, based on the tolerance of the field to errored bits, it determines whether the number of errors is more than the defined number of tolerable errors. If errored bits are greater than correctable bits then the call or message is considered not received at the physical layer.

For transmission header and data payload processing, said network simulation means 9 determines the applicable error bits by counting the number of errored bits between start and end bit positions of defined transmission header field, as well as separately counting the data payload field. Next, it determines whether the number of errors is more than the defined number of correctable errors, taking into consideration interleaving and the error detection and coding scheme, as follows:

if no coding is used, then examine entire field for errors if Interleaver depth is 1, then examine the field codeword by codeword else if FH mode, then segment the field based on the size of the hop otherwise, segment the field based on interleaver size:
SegmentSize=CodewordLength·InterleaverDepth
NumSegments=SegmentSize÷FieldLength
NumCorrectErrors=correctable symbols per codeword·InterleaverDepth while (N≦number of start/end EB positions) and (SegCount≦NnumSegment) isolate only those bit errors that fall within the segment if NumErrorBits>NumCorrectErrors for header segments then message is in error; else examine data field where left off if NumErrorBits>NumCorrectErrors for data segments then message is in error.

Figure 9:
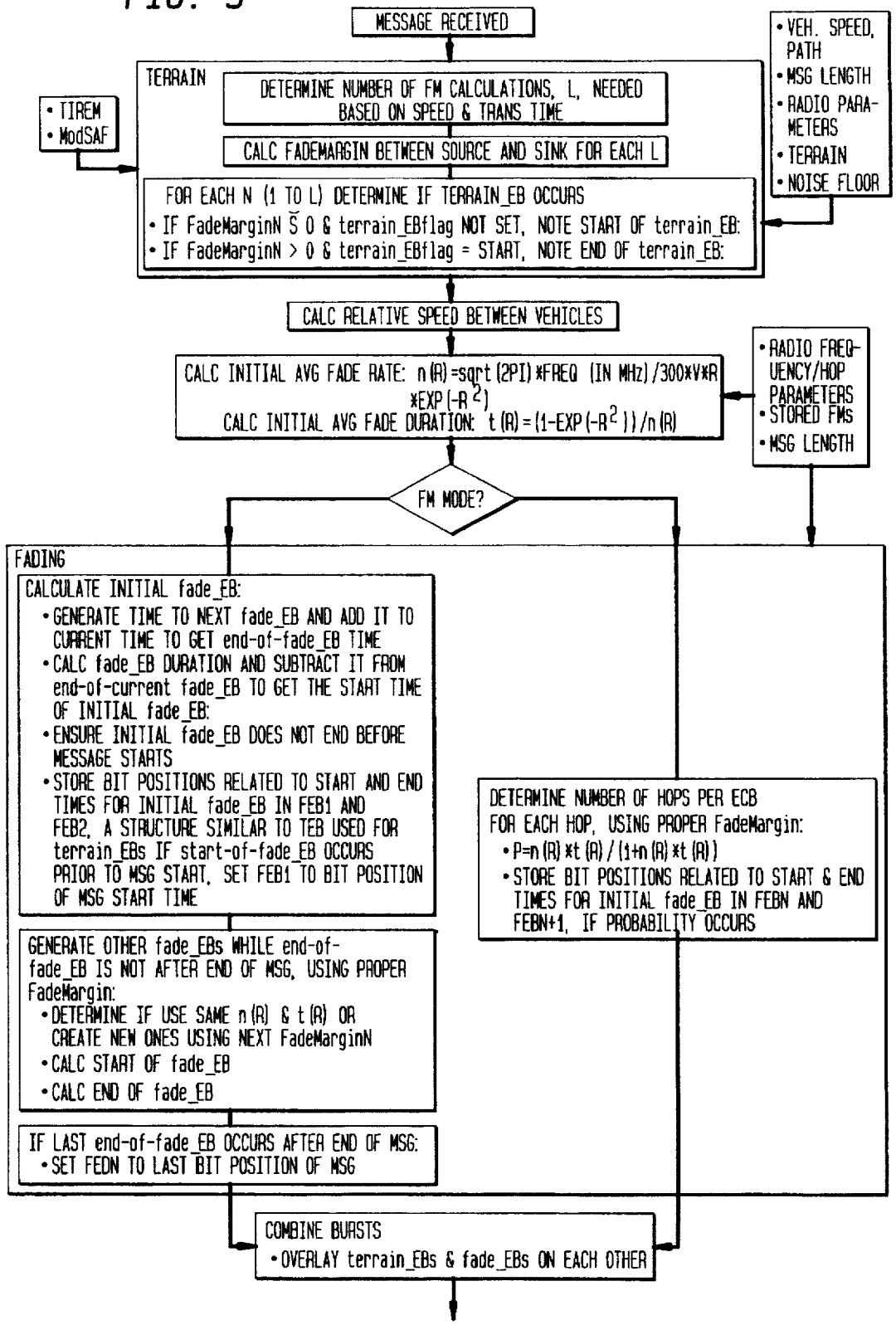
FIG. 9 is a first part of a flow diagram illustrating how certain formulas and portions of the present invention interact and cooperate.
Figure 10:
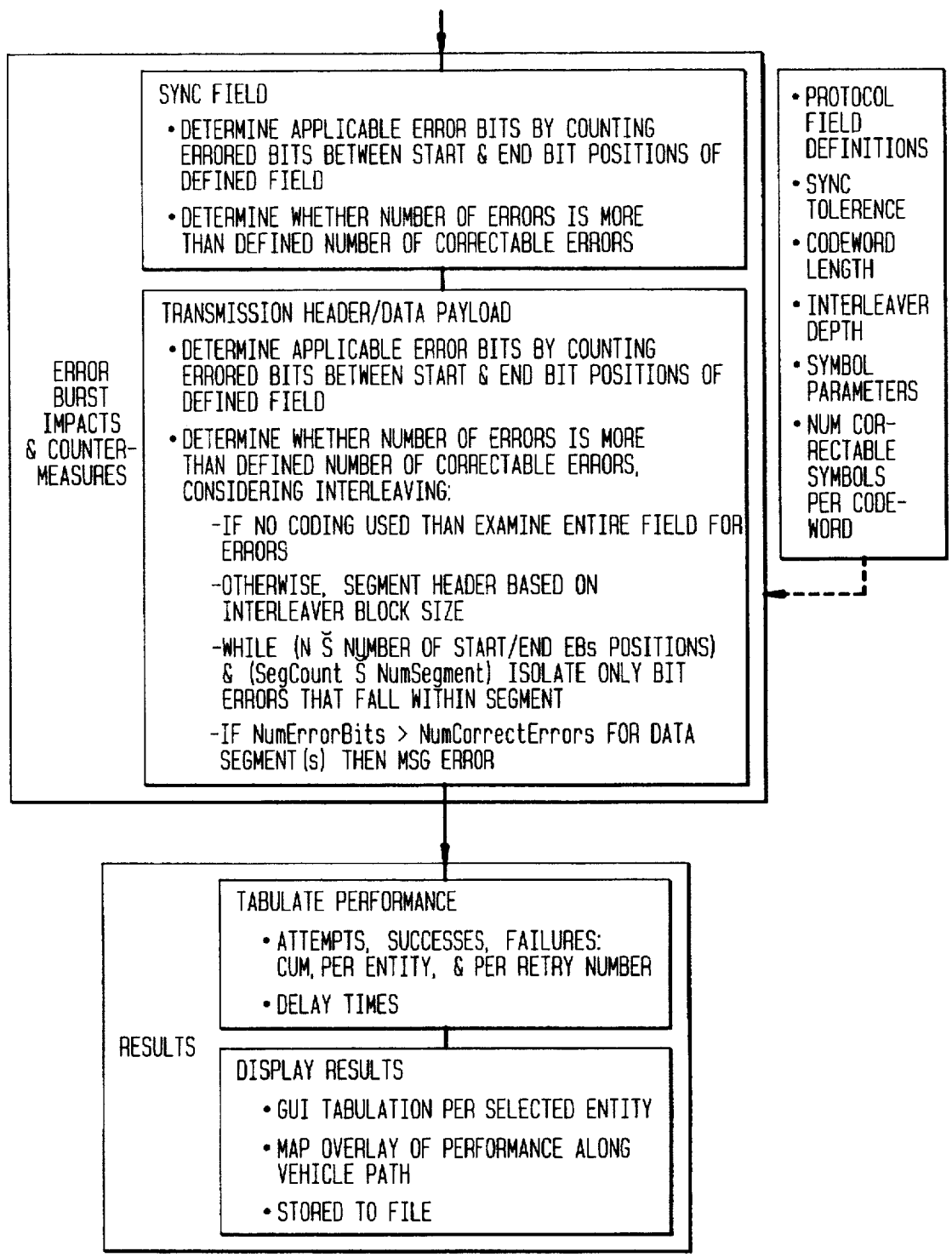
FIG. 10 is a second part of a flow diagram illustrating how certain formulas and portions of the present invention interact and cooperate.
Figure 11:
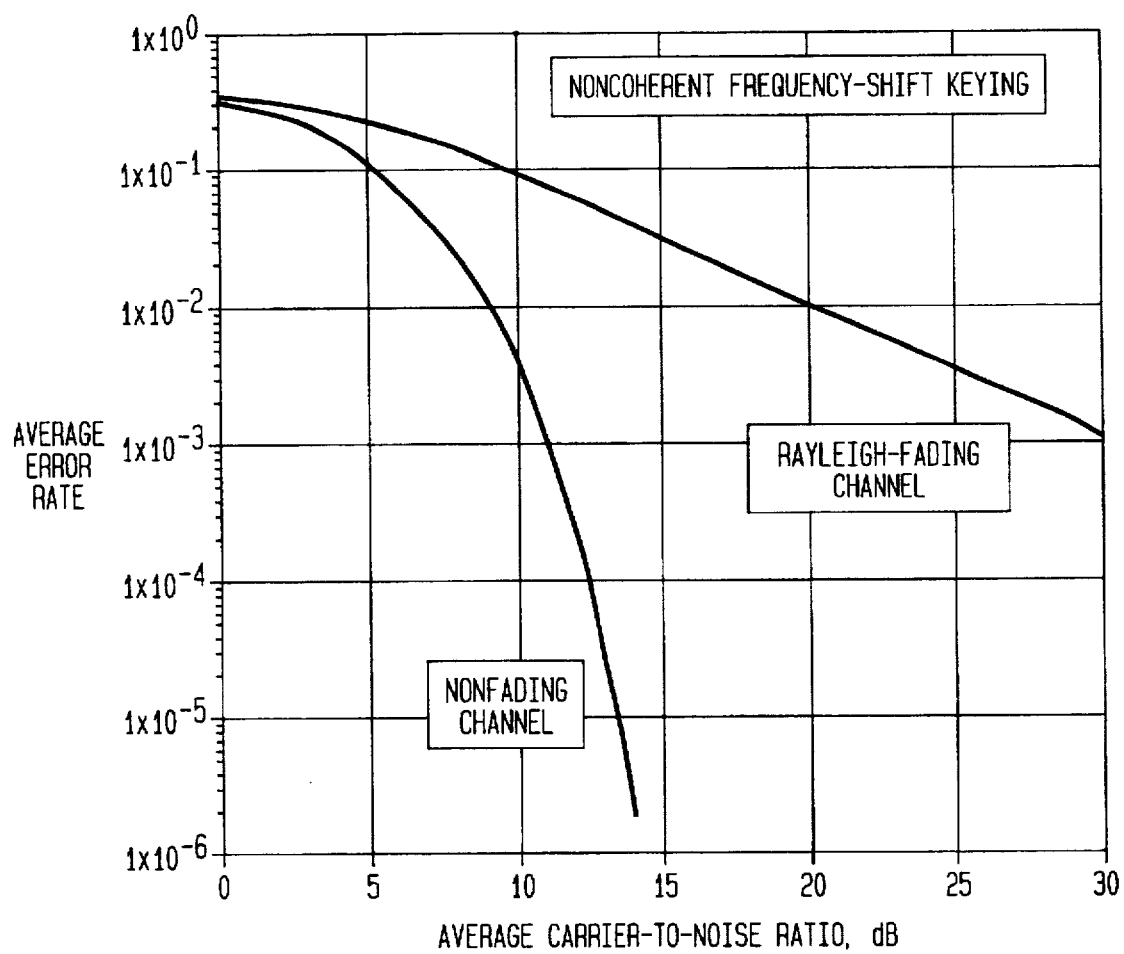
FIG. 11 is a chart depicting bit-error probability in connection with the multipath modeling means.

FIGS. 9 and 10 are a flow diagram illustrating how these formulas and computer programs interact in accordance with the present invention. Those skilled in the art will readily understand the application of these formulas to the network simulation process, as well as the importance of determining error bursts when realistically simulating communications effects in accordance with the present invention.

Said network simulation means 9 also allows each vehicle including its radio and the gateway to be simulated by separate computers with each computer screen displaying the vehicle's location on a map background that includes the battlefield environment. Said network simulation means 9 provides a joystick or trackball for the operator to simulate vehicle movement, a plurality of speakers and a plurality of on-screen message windows provide the operator with real-time voice and data communications capability utilizing standard communications procedures of the radios being modelled.

Said channel error burst model is provided as part of said multipath modeling means 20 in order to address the major communications problem caused by error bursts in the digital bit stream due to both short and long-term variations of RSS, including a plurality of time rate RSS variations which increase with vehicle speed. FIGS. 6 and 7 demonstrate that whenever RSS drops below a radio system's performance threshold, the digital bit stream will experience an unacceptable burst of errors of varying duration and time. Further, terminal movement can also vary RSS significantly. Since the bit error rate (BER) thresholds can vary, and signal-to-noise ratios correspond to the threshold for each radio type, the RSS for a channel in difficult multipath environment is described by Rayleigh-fading statistics. This fading increases bit errors caused by thermal noise for the simple case of noncoherent frequency-shift keying. Such RSS effects are included in said channel error-burst model of the multipath modeling means 20.

The cooperation and interaction between said network simulation means 9, said channel error-burst model and said multipath modeling means 20 advantageously simulates error bursts which are of particular interest in connection with any attempt to realistically portray the highly mobile digital battlefield. Communications connectivity problems on a digitized battlefield are often attributed to radio sources, particularly in the case of stationary radio links, signal blockage from terrain and severe time-varying reduction in signal strength caused by atmospheric layering, or ducting. Propagation problems are further impacted by movement because signal strength variations increase with the speed of moving vehicles so that radio connectivity varies dramatically and often as a function of factors such as terrain, propagation conditions, link length and other factors.

Figure 1:
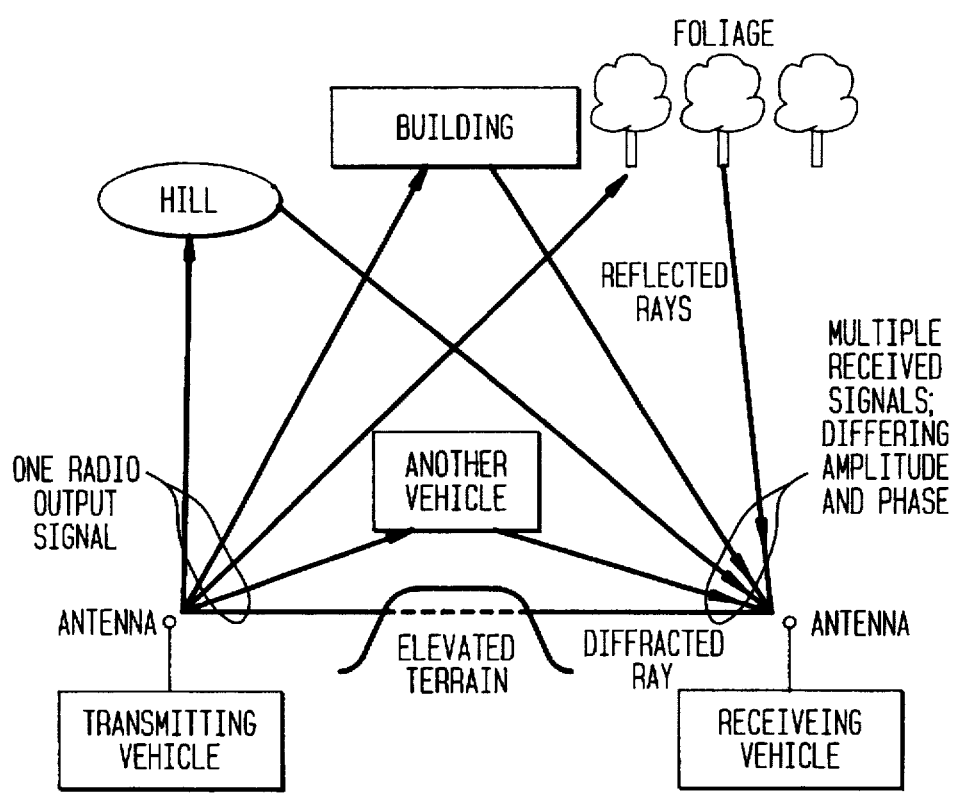
FIG. 1 depicts multiple received components for one transmitted signal.
Figure 2:
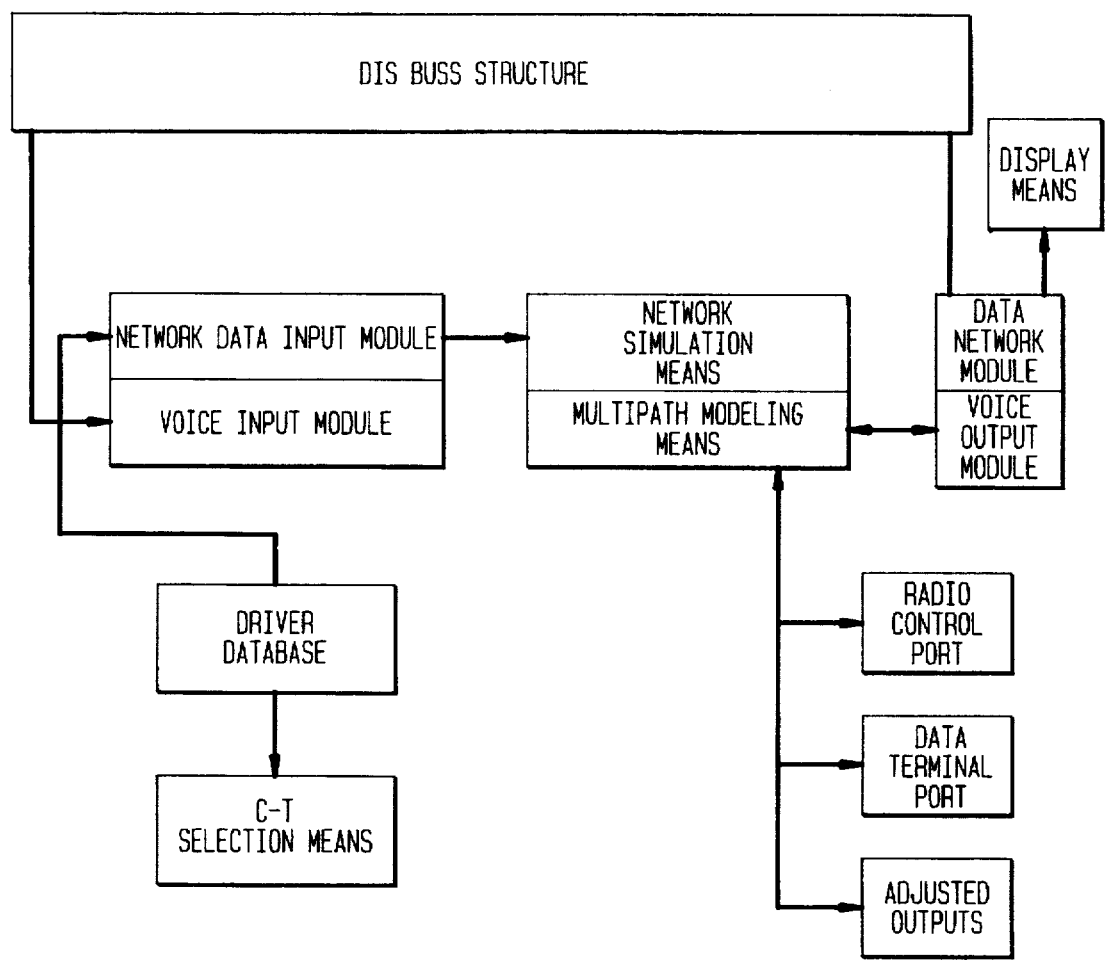
FIG. 2 is a conceptual diagram illustrating the basic operation of all embodiments of the present invention.
Figure 3:
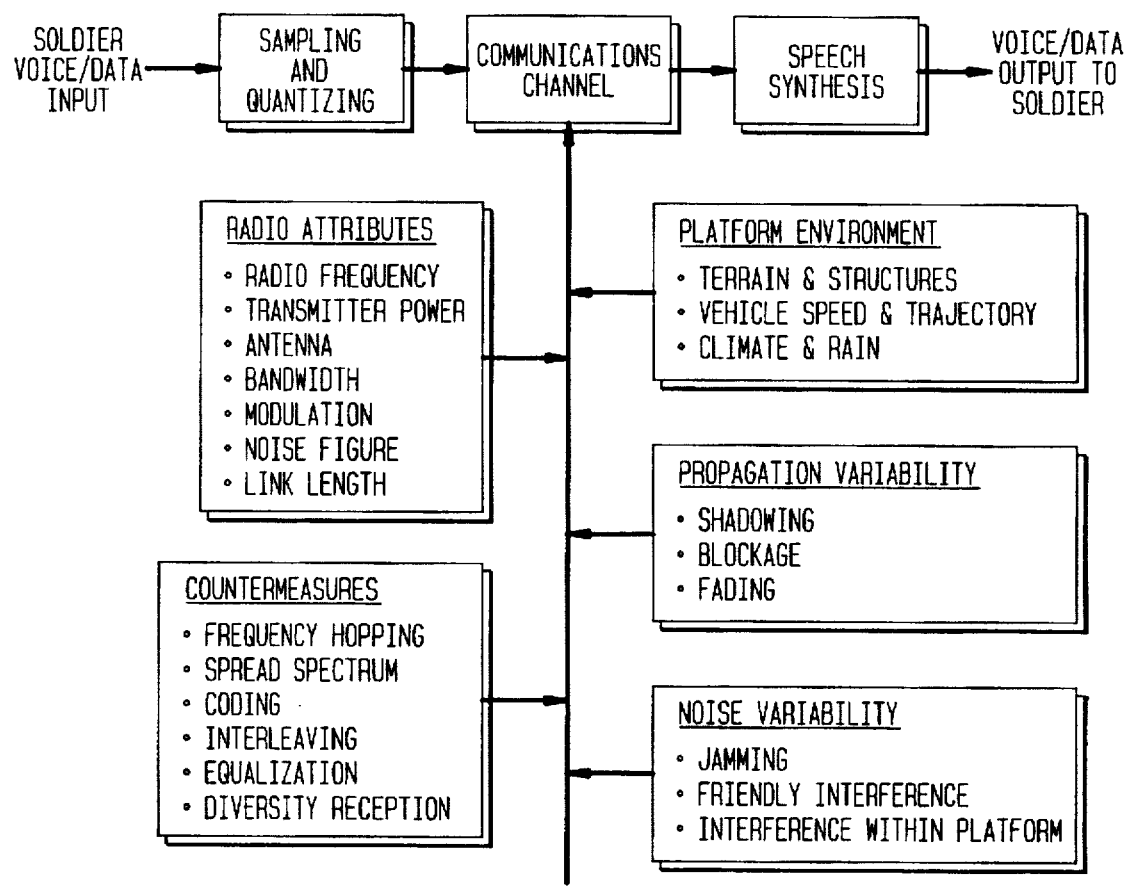
FIG. 3 is a block diagram illustrating important features of single-link on-the-move simulation.

FIG. 1 depicts the varying influences on communications signal strength where the receiver is continually exposed to multiple replicas of the transmitted signal that interact destructively with each other, including signal return replicas from structures, hills, foliage and atmospheric layers. These factors can cause communications signal impairments, which, in turn cause time-varying error bursts in the digital bit stream. FIG. 9 is a chart depicting bit-error probability, while Table I provides error-burst statistics.

Said multipath modeling means 20 also known as the Integrated Terrain-Environment Multipath Model ("ITEMM"), provides real-time computation of a number of error-burst effects and link margins in order to achieve a high fidelity simulation including the effects of terrain-shadowing combined with multi-path effects described by a Rayleigh process when the environment has many distinct objects such as buildings, clusters of trees, hills and other vehicles, as depicted in FIG. 1. Said multipath modeling means 20 is a generic single-link, on-the-move radio model, having said ITEMM software program, simulating a plurality of real-time, link-level communications impairments for voice or date bytes transported over said digital radio model being embedded within said multipath modeling means 20 with built-in coding and other countermeasures such as message merging.

Said ITEMM software program simulates a plurality of communications impairments such as error bursts, signal fades, signal propagation interference due to terrain shadowing and destructive multipath effects, moving platforms and other factors with simulated communications occurring between two vehicles moving over a map background in accordance with the real-time vehicle motion capability provided by a Modular Semi-Automated Forces ("ModSAF") software program, further providing a graphical-user interface ("GUI"). Said ITEMM software program processes a plurality of encoded audio, raw binary data and application-specific data at the byte level and integrates a plurality of communications-effects algorithms with a Terrain-Integrated Rough-Earth Model ("TIREM") and said ModSAF software program. Said ModSAF software inputs map data to said ITEMM software program to allow a plurality of selections such as vehicle contour route paths, color-coding a vehicle path with message-transmission results and determining a path profile for path loss calculations. Said ITEMM software program is modular, which allows simulation of different radios by changing or adding software, and is reusable in later DIS applications.

Said ITEMM software program includes a plurality of real-time algorithms including FH, error coding (Hamming, Golay and Reed-Solomon), path losses and simulation of vehicle movement which can be utilized in calculating the RSS for a channel in a multipath environment as described by Rayleigh-fading amplitude statistics. Said plurality of real-time algorithms further enhance the realism of the system.

In operation during a simulation, said ITEMM software program will process said plurality of encoded audio, raw binary data and application-specific data at the byte level by extracting a plurality of data inputs and a plurality of data fields of a signal PDU. Said data input being a function of basic radio attributes and countermeasures, such as antenna location and pattern, frequency, bandwidth, power, modulation type and other parameters, as well as the time the information was transmitted, or obtained from said signal PDU, results in calculation of the path and terrain loss and fade margin. Then a plurality of random multipath fading "hits" would be determined. Byte impairments caused by said plurality of impairments such as platform environment, propagation variability and noise variability are simulated by changing bit values in the bytes within said PDU.

Said multipath modeling means 20 integrates both deterministic and stochastic models. Real-time simulation dictates determinism regarding terrain in such a way that a hill comes between them, then the particular hill and its effects must be described accurately and deterministically. Since sufficient computing power is not available to deterministically describe the effect of every tree, vehicle, building, cliff or hill in the neighborhood of the two platforms and in the area of the path between them, the present invention integrates the deterministic and stochastic models. In operation, a plurality of multipath effects from a stochastic model are added to a plurality of deterministic effects.

Performance modeling is in accordance with the layering of the Open Systems Interconnection ("OSI") model, specifically linking communications by physical, data-link, network, transport and application layers. Enhanced system performance models of the present invention and field planning tools have combined new radio propagation reliability algorithms, a channel model of narrow-band ultra-high-frequency ("UHF") and super-high-frequency ("SHF") stationary terminal LOS tactical radio systems, along with a worldwide climate factor database. A plurality of command and control system performance models accepts mission threads, produces communications traffic loads and provides information on throughput and grade of service.

Said multipath modeling means 20 further includes said digital radio model in the present invention in order to satisfy the command and control needs of the digitized battlefield for voice, data and imagery in a wireless communications mode. Said digital radio model, having a plurality of high-capacity performance parameters and a plurality of Line Of Sight ("LOS") link performance and technology characteristics, includes LOS radio link characteristics for the simulation to allow planning targets for link path reliability, path reliability, information capacity of a plurality of radio channels, bandwidth and operating radio frequency.

FIGS. 12–16 depict an example of a simulation exercise, including a run-time display, utilizing the modeling apparatus of the present invention. The present invention allows an operator to understand effects such as terrain, environment, multipath interference and other phenomena on communications by realistically reproducing communications problems that will be encountered during maneuvers of stationary and on-the-move nodes on the digitized battlefield. The operator can clearly visualize the performance of said plurality of communications traffic selection database outputs, arrow 6, by observing the dynamic displays of link/network performance data and the graphic display of both successful and failed message transmissions and receptions against a terrain map background. Simulation results along with the observed visual display on said display means 31 helps the operator further understand and justify the resulting network behavior.

Figure 12:
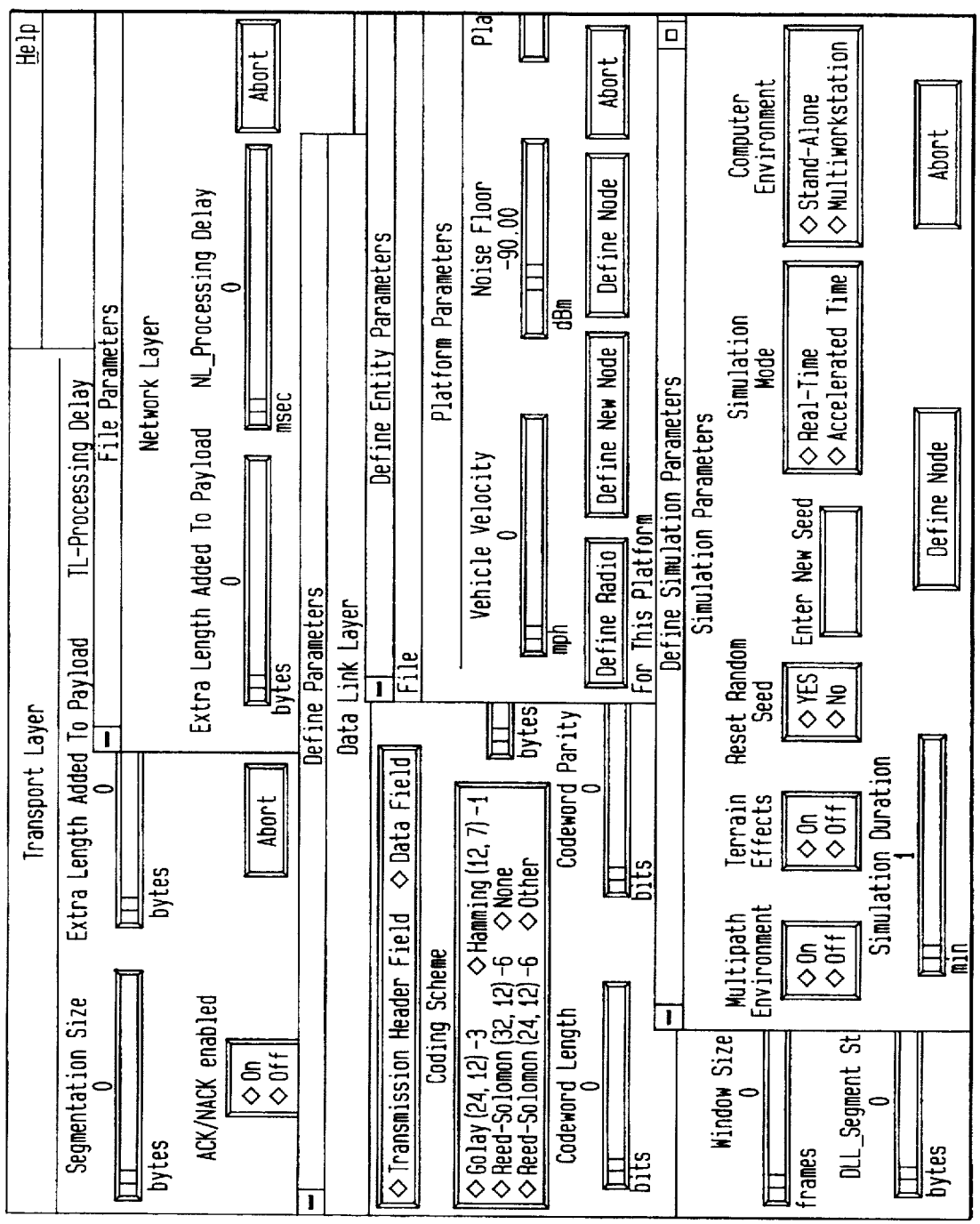
FIG. 12 is an example of a parameter screen of the network simulation means.
Figure 13:
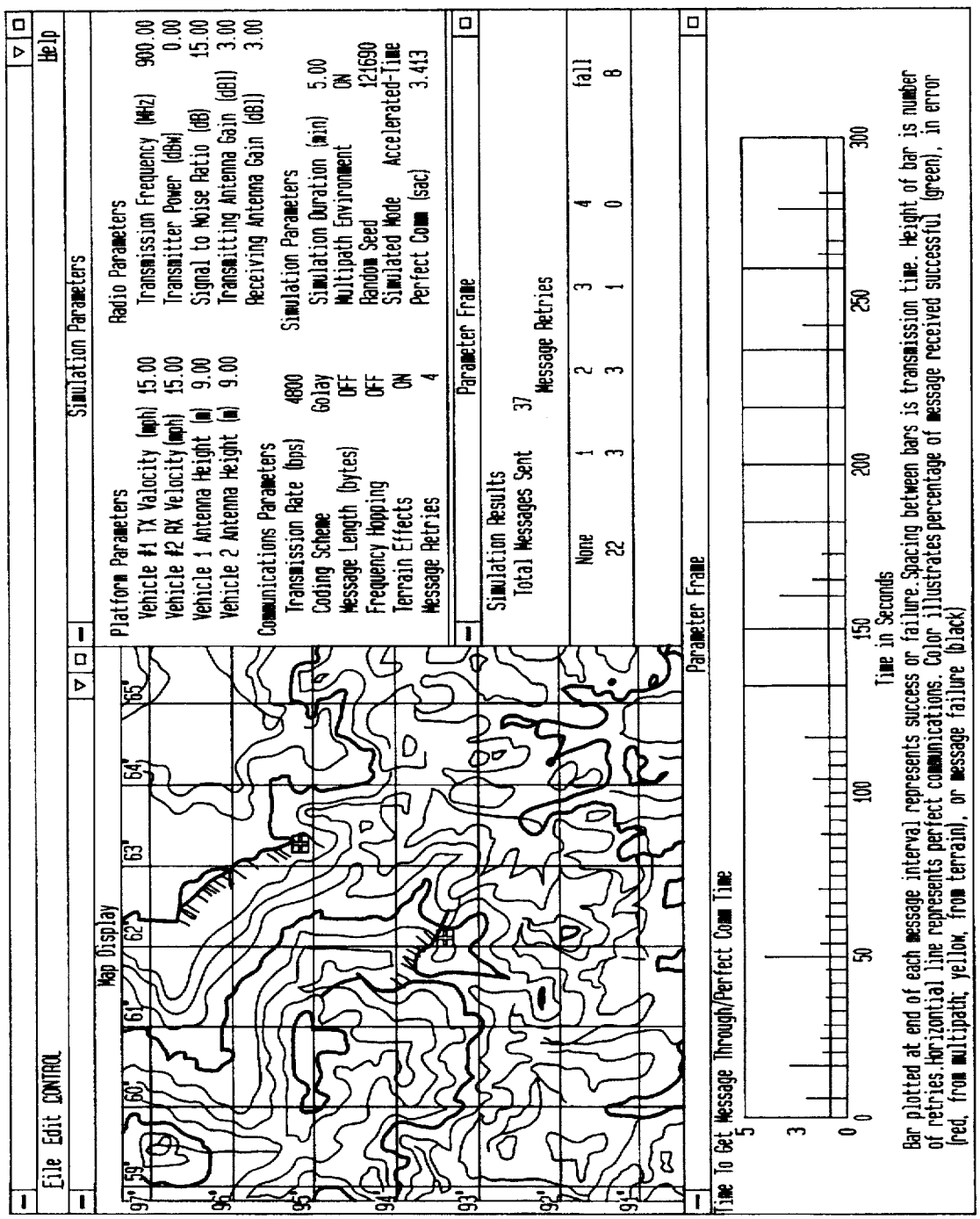
FIG. 13 is an example of a high-resolution display of simulated nodes and associated networks following operator selection of parameters superimposed on a terrain map background of the multipath modeling means.
Figure 14:
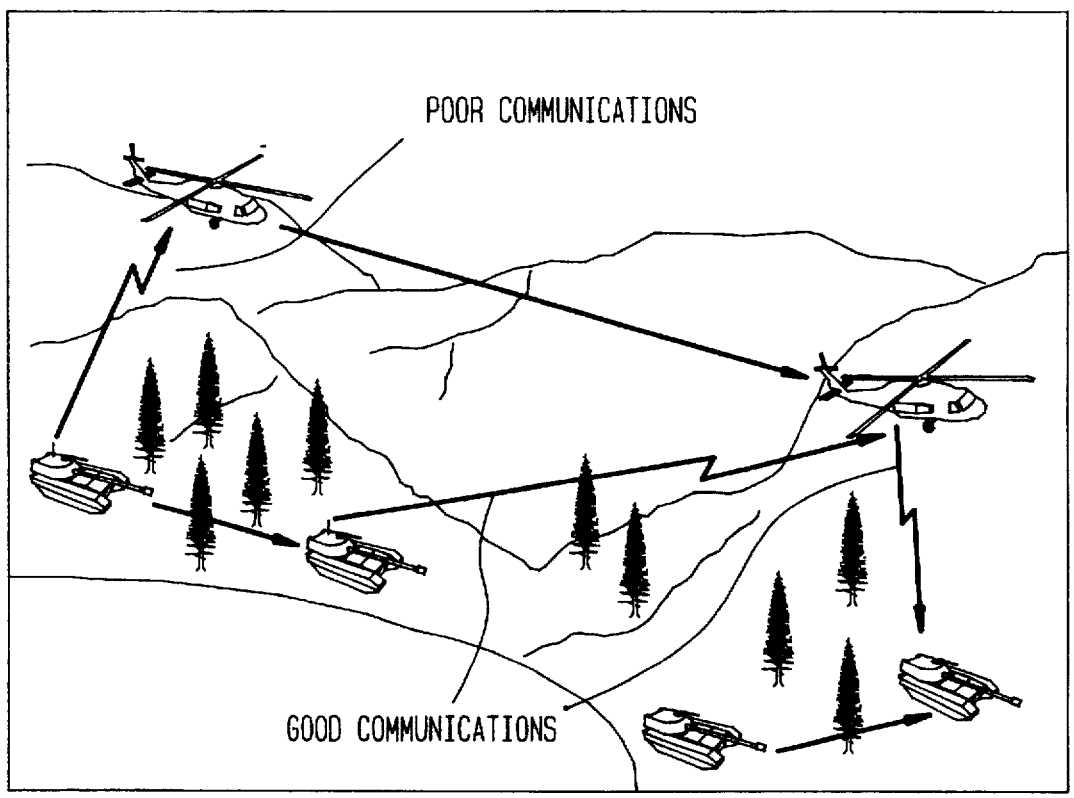
FIG. 14 is an example of a communications scenario being simulated showing a number of communications platforms during a simulation exercise.

Referring now to FIG. 12, said display means 31 of FIG. 4 shows the operator one of a plurality of parameter screens for the operator to select from said plurality of communications protocol parameter input selections, arrow 5, in order to generate said communications traffic selection database output, arrow 6. Referring now to FIG. 13, following parameter selection, the operator is then shown one of a plurality of the run-time displays, FIG. 13 being an example of a run-time display from said network simulation means 9, which utilizes the full graphics capability of said network simulation means 9 to provide high-resolution color display of the simulated nodes and their associated networks resulting from said communications traffic selection database output, arrow 6, superimposed on said terrain map.

Figure 15:
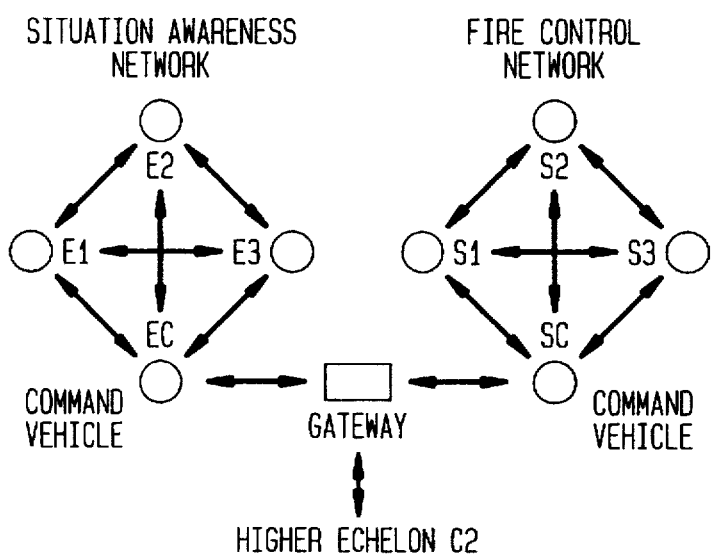
FIG. 15 is a conceptual diagram of two simulation platforms during a simulation exercise.
Figure 16:
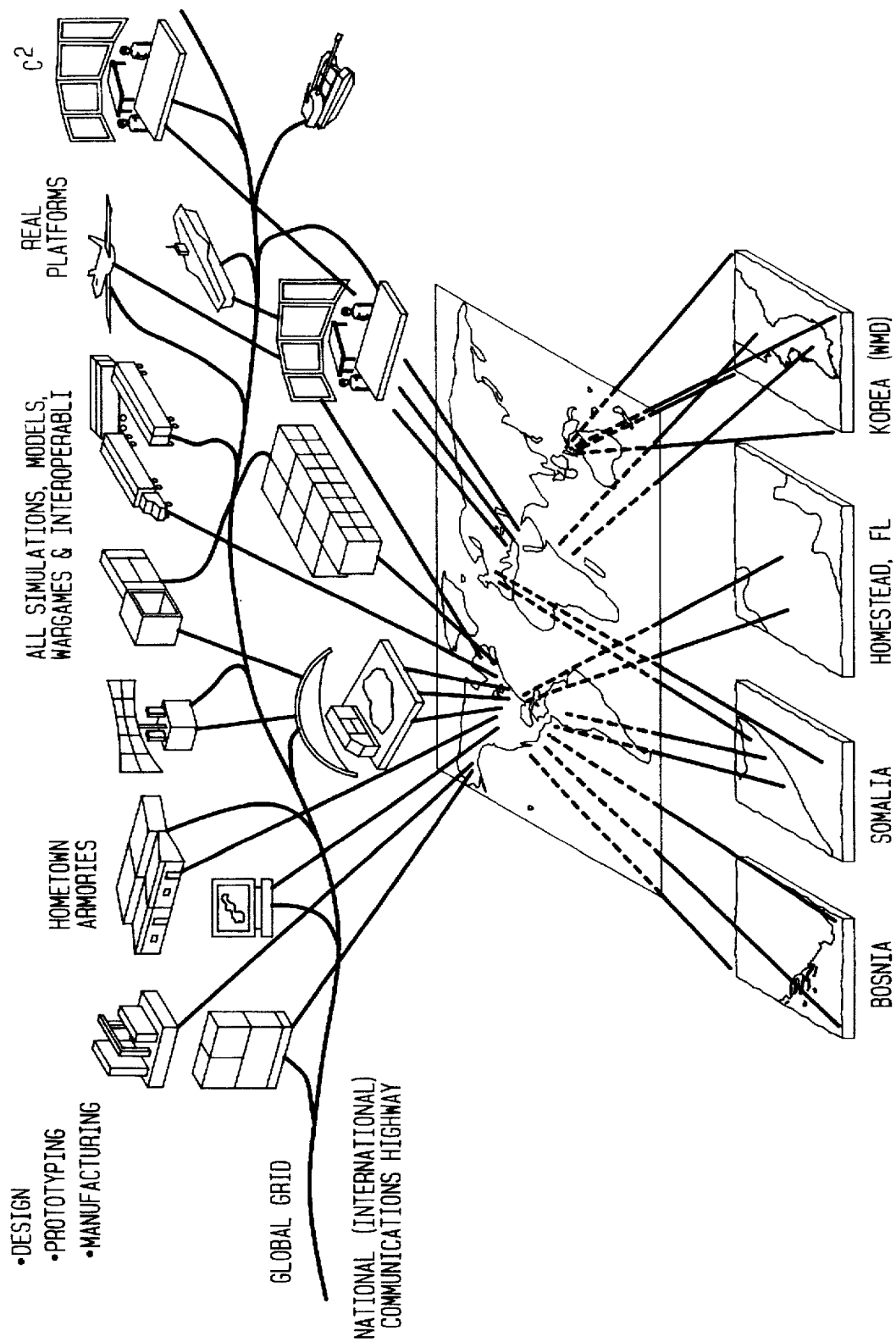
FIG. 16 is a an example of a complex communications scenario interacting with DIS during a simulation exercise.

FIG. 13 also depicts a plurality of separate windows allocated to dynamically display the simulation results in both graphical and tabulated vector formats. The simulation results reflect accurate data collected from events local to the host computer and are formatted for quick identification and easy interpretation. The simulation results from the host computers are obtained dynamically either during the simulation or at the end of the simulation using said plurality of DIS PDU's. The dynamic performance displays shown on said display means 31 give the operator a rapid view-from-above of all events which occur during the simulation. Displaying FIG. 13 on said display means 31 will show the operator color-coded information concerning functionality and status of a platform, as well as relative motion and trajectory against said terrain map background. For example, if the communications scenario depicted in FIG. 14 was being simulated, the various platforms (vehicle and helicopter) would be shown against a map background similar to that depicted in FIG. 13 along with other graphical and statistical information about the quality of the communications link between the platforms. Utilizing said DIS structure 15 of the network simulation means 9, a far more complex simulation such as the platforms and events depicted in FIG. 16 would be displayed on any given number of simulation computers against the map background similar to that shown in FIG. 13. FIG. 15 depicts a conceptual diagram of a simulation awareness network having a plurality of interacting nodes and a command vehicle along with a fire control network having a plurality of interacting nodes and a command vehicle, both of said networks communicating through a gateway and having the capability to communicate with a higher echelon. It is noted that FIGS. 12–16 are examples intended to be representative only.

In one experiment, using said multipath modeling means 20 as a stand-alone device, the effectiveness of very-high frequency (VHF) and ultra-high frequency (UHF) radios on moving vehicles under selected battlefield scenarios was tested with the results depicted in Table II. The sample communications performance involved communicating platforms travelling at 30 mph and clearly demonstrated the importance of VHF over the UHF spectrum use in the reliable transmission of digital information on the tactical, digitized battlefield.

Another experiment analyzed message failure rates with respect to varying protocol parameters, error coding, single channel versus frequency and fixed versus variable size interleavers for moving VHF radios traveling over difficult terrain at a 15 mph vehicle speed, 50-MHz radio frequency and 4800-bps rate. The results are shown in Tables III and IV and provided numerous insights on the impact of multipath fading on normal communications and the effectiveness of frequency hopping to counter error bursts attributable to fading.

The present invention also encompasses a method for the realistic simulation of wireless information transport systems comprising the steps of entering a plurality of data inputs and a plurality of performance characteristics into a communications traffic selection means, said communications traffic selection means having a plurality of command databases, a plurality of mission thread databases and a traffic scenario database, selecting a plurality of communications protocol parameter selections, and providing a selection means database output from said communications traffic selection means database to a driver database. Converting said selection means database output to a driver data output by converting said selection means database output in said driver database into a plurality of statistical data, and transmitting said driver data output from said driver database to a network data input module. Inputting a plurality of voice information from an operator to a voice input module so that said network data input module and said voice input module provide a plurality of simulation inputs to a network simulation means. Said network simulation means, being rule-driven and multi-network capable, and having access to a multipath modeling means, simulates a plurality of stationary and moving digitized communications platforms. Said network simulation means cooperating with said multipath modeling means, said multipath modeling means having an ITEMM software program and a digital radio model, converts said plurality of simulation inputs into a multipath output by integrating a plurality of deterministic communications effects and a plurality of stochastic communications effects with said plurality of simulation inputs within said ITEMM software program, and transmits said multipath output from said digital radio model to a data terminal port. Adjusting said multipath output in said data terminal port, said data terminal port transmitting a data adjusted output to said multipath modeling means. Transmitting said multipath output from said digital radio model to a radio control port, adjusting said multipath output in said radio control port and transmitting a voice adjusted output to said multipath modeling means. Connecting to a display means and said network simulation means combining said data adjusted output and said voice adjusted output with said multipath output to provide a realistic, real-time simulation output signal to said display means.

Any number of variations on the system and method of the present invention are possible and are all considered to be within the scope of the disclosure and appended claims.

TABLE I

| Channel Reliability Percent | Single-Frequency Fade Margin dB | Number of Error Bursts per Minute | Average Burst Duration Milliseconds |
|---|---|---|---|
| 30 MHz, 15 Miles/Hour: | | | |
| 90 | 10 | 29 | 198 |
| 99 | 20 | 10 | 60 |
| 99.9 | 30 | 3 | 19 |
| 88 MHz, 15 Miles/Hour: | | | |
| 90 | 10 | 85 | 67 |
| 99 | 20 | 29 | 20 |
| 99.9 | 30 | 9 | 6 |
| 435 MHz, 15 Miles/Hour: | | | |
| 90 | 10 | 418 | 14 |
| 99 | 20 | 145 | 4 |
| 99.9 | 30 | 46 | 1.3 |
| 900 MHz, 15 Miles/Hour: | | | |
| 90 | 10 | 866 | 6.6 |
| 99 | 20 | 299 | 2.0 |
| 99.9 | 30 | 96 | 0.6 |

TABLE II

| | | Msg Length = 2048 bytes | | | | Msg Length = 132 bytes | | | |
|---|---|---|---|---|---|---|---|---|---|
| Freq | Code | Fall | Succ | Tot | Fall/Tot | Fall | Succ | Tot | Fall/Tot |
| 900 MHz | None | 57 | 18 | 75 | 0.760 | 111 | 189 | 300 | 0.370 |
| | Hamming | 54 | 21 | 75 | 0.720 | 92 | 208 | 300 | 0.307 |
| | Golay | 39 | 35 | 75 | 0.520 | 9 | 291 | 300 | 0.030 |
| | R-S | 9 | 66 | 75 | 0.120 | 5 | 295 | 300 | 0.017 |
| 30 MHz | None | 26 | 49 | 75 | 0.347 | 19 | 281 | 300 | 0.063 |
| | Hamming | 25 | 50 | 75 | 0.333 | 17 | 283 | 300 | 0.057 |
| | Golay | 24 | 51 | 75 | 0.320 | 16 | 284 | 300 | 0.053 |
| | R-S | 21 | 54 | 75 | 0.280 | 12 | 288 | 300 | 0.040 |

TABLE III

| Message Size | Hop Interleaver | | Non-Hop Interleaver | |
|---|---|---|---|---|
| (Bytes) | Fixed | Variable | Fixed | Variable |
| 32 | 0.80 | 0.80 | 0.64 | 0.65 |
| 132 | 0.87 | 0.81 | 0.70 | 0.65 |
| 2048 | 0.97 | 0.89 | 0.86 | 0.77 |
| 4096 | 0.96 | 0.95 | 0.96 | 0.81 |

TABLE IV

| Coder | Multipath Generator | FH | Failure Rate |
| --- | --- | --- | --- |
| None | off | off | 0.26 |
| None | on | off | 0.64 |
| Hamming | on | off | 0.40 |
| Hamming | on | on | 0.62 |
| Golay | on | off | 0.31 |
| Golay | on | on | 0.49 |
| Reed-Solomon | on | off | 0.29 |
| Reed-Solomon | on | on | 0.44 |

What we claim is:

1. A realistic modeling apparatus for simulation of wireless information transport systems comprising:

a data loading means enters a plurality of data inputs and a plurality of communications performance characteristics to a communications traffic selection means, said communications traffic selection means having a plurality of command databases, a plurality of mission thread databases and a traffic scenario database;

a plurality of communications protocol parameter input selections made from said communications traffic selection means provides a selection means database output to a driver database;

said driver database converts said selection means database output into a plurality of statistical data forming a driver data output, said driver database output being transmitted to a network data input module connected to a network simulation means;

a plurality of voice inputs from an operator are sent to a voice input module, said voice input module and said network data input module providing a plurality of simulation inputs to said network simulation means;

said network simulation means, being rule-driven and multi-network capable, simulates a plurality of stationary and moving digitized communications platforms;

said network simulation means having access to a multipath modeling means, said multipath modeling means, having an ITEMM software program and a digital radio model;

said ITEMM software program integrates a plurality of deterministic communications effects and a plurality of stochastic communications effects with said plurality of stationary and moving digitized platforms;

said multipath modeling means cooperates with said network simulation means to influence said plurality of simulation inputs, converting said plurality of simulation inputs and said plurality of stationary and moving digitized platforms into a multipath output;

said digital radio model transmits said multipath output to a data terminal port, said data terminal port adjusts said multipath output and transmits a data adjusted output to said multipath modeling means;

said digital radio model transmits said multipath output to a radio control port, said radio control port adjusts said multipath output and transmits a voice adjusted output to said multipath modeling means;

a display means; and said multipath modeling means combines said data adjusted output and said voice adjusted output with said multipath output to provide a realistic, real-time simulation output signal to said display means.

2. The realistic modeling apparatus for simulation of wireless information transport systems as recited in claim 1, further comprising said voice input module receiving a plurality of voice inputs from a plurality of operators.

3. The realistic modeling apparatus for simulation of wireless information transport systems recited in claim 2, further comprising:

said multipath modeling means providing a terrain map background displayed on said display means; and said multipath modeling means displays said plurality of stationary and moving digitized communications platforms on said terrain map background.

4. The realistic modeling apparatus for simulation of wireless information transport systems recited in claim 3, further comprising:

said network simulation means simulates a plurality of simultaneous voice, data and imagery information exchanges;

said plurality of simultaneous voice, data and imagery information exchanges being at intranetwork and internetwork levels among said plurality of stationary and moving digitized communications platforms; and said network simulation means combines a plurality of circuit, packet and asynchronus transfer mode switches and a plurality of net radios.

5. The realistic modeling apparatus for simulation of wireless information transport systems recited in claim 4, further comprising:

said network simulation means permits the operator to modify said selection means database output and said driver data output based on the possible scenarios encountered during simulation; and said network simulation means is plug-and-play compatible.

6. The realistic modeling apparatus for simulation of wireless information transport systems recited in claim 5, wherein said network simulation means is configured to operate at a real-time speed, a faster than real-time speed and a near real-time speed.

7. The realistic modeling apparatus for simulation of wireless information transport systems recited in claim 6, further comprising:

said network simulation means having a Distributed Interactive Simulation (DIS) Interface structure;

said network simulation means having a DIS network for interoperability among said plurality of operators during simulation; and said DIS network complying with a plurality of underlying DIS performance requirements and a plurality of DIS protocols.

8. The realistic modeling apparatus for simulation of wireless information transport systems recited in claim 7, further comprising:

said network simulation means provides a plurality of simulation outputs;

said plurality of simulation outputs include a plurality of network, behavior and grade of service outputs; and said plurality of simulation outputs further comprising a plurality of message transmission delays, a plurality of network-access delays, a plurality of intranetwork routing data, a plurality of internetwork routing data and a graphic display on said computer display means.

9. The realistic modeling apparatus for simulation of wireless information transport systems recited in claim 8, further comprising:

said network simulation means providing a plurality of realistic communications effects for both stationary and on-the-move voice, data and imagery communications; and said plurality of realistic communications effects includes a plurality of terrain error bursts, a plurality of fading error bursts in both fixed and hopping frequencies and a plurality of combined error bursts and error burst impacts with countermeasures.

10. The realistic modeling apparatus for simulation of wireless information transport systems recited in claim 9, further comprising:

said multipath modeling means having a channel error-burst model;

said channel error burst model providing a plurality of Received Signal Strength (RSS) effects caused by error bursts in the digital bit stream due to both short and long-term variations of RSS; and said plurality of RSS effects includes a plurality of time rate RSS variations which increase with vehicle speed.

11. The realistic modeling apparatus for simulation of wireless information transport systems recited in claim 10, further comprising said network simulation means having a means for simulating radio attributes, a means for simulating countermeasure signals, a means for simulating platform environment, a propagation variability means and a noise variability means.

12. The realistic modeling apparatus for simulation of wireless information transport systems recited in claim 11, wherein:

said multipath modeling means computes in real-time a plurality of error-burst effects, a plurality of link margins and a plurality of terrain-shadowing effects combined with a plurality of multipath effects;

said ITEMM software program of the multipath modeling means simulates a plurality of real-time, link-level communications impairments for voice or date bytes transported over said digital radio model; and said plurality of real-time, link-level communications impairments include error bursts, signal fades, signal propagation interference due to terrain shadowing, destructive multipath effects and moving platforms.

13. The realistic modeling apparatus for simulation of wireless information transport systems recited in claim 12, further comprising said display means displays a pictorial representation of link connectivity to the operator.

14. The realistic modeling apparatus for simulation of wireless information transport systems recited in claim 13, wherein said network simulation means, said channel error-burst model, said digital radio model and said multipath modeling means are computer programs.

15. The realistic modeling apparatus for simulation of wireless information transport systems recited in claim 14, wherein:

said network simulation means is a Real-Time Communications Network Simulator (RTCNS); and said multipath modeling means is an Integrated Terrain-Environment Multipath Model (ITEMM).

16. The realistic modeling apparatus for simulation of wireless information transport systems recited in claim 3, wherein said terrain map background is provided by a Terrain-Integrated Rough Earth Model of said multipath modeling means.

17. A method for realistic simulation of wireless information transport systems comprising the steps of:

entering a plurality of data inputs and a plurality of network performance characteristics into a communications traffic selection means, said communications traffic selection means having a plurality of command databases, a plurality of mission thread databases and a traffic scenario database;

making a plurality of communications protocol parameter input selections from said communications traffic selection means;

providing a selection means database output from said communications traffic selection means database to a driver database;

converting said selection means database output in said driver database into a plurality of statistical data, and transmitting a driver database output from said driver database to a network data input module connected to a network simulation means;

inputting a plurality of voice information from an operator to a voice input module, said voice input module-and said network data input module providing a plurality of simulation inputs to said network simulation means;

said network simulation means, being rule-driven and multi-network capable, simulates a plurality of stationary and moving digitized communications platforms, said network simulation means having access to a multipath modeling means, said multipath modeling means having an ITEMM software program and a digital radio model;

converting said plurality of simulation inputs and said plurality of stationary and moving digitized communications platforms into a multipath output, within said ITEMM software program, by integrating a plurality of deterministic communications effects and a plurality of stochastic communications effects with said plurality of stationary and moving digitized platforms, said network simulation means cooperating with said multipath modeling means;

transmitting said multipath output from said digital radio model to a data terminal port;

adjusting said multipath output in said data terminal port and transmitting a data adjusted output to said multipath modeling means;

transmitting said multipath output from said digital radio model to a radio control port;

adjusting said multipath output in said radio control port and transmitting a voice adjusted output to said multipath modeling means;

connecting said network simulation means and said multipath modeling means to a display means; and combining said data adjusted output and said voice adjusted output with said multipath output in said multipath modeling means to provide a realistic, real-time simulation output signal to said display means.

18. The method for realistic simulation of wireless information transport systems recited in claim 17, further comprising receiving a plurality of voice inputs in said voice input module from a plurality of operators.

19. The method for realistic simulation of wireless information transport systems recited in claim 18, further comprising:

displaying a terrain map background from said multipath modeling means on said display means; and displaying said plurality of stationary and moving digitized communications platforms on said terrain map background of the multipath modeling means.

20. The method for realistic simulation of wireless information transport systems recited in claim 19, further comprising:

simulating a plurality of simultaneous voice, data and imagery information exchanges in said network simulation means;

said plurality of simultaneous voice, data and imagery information exchanges being at intranetwork and internetwork levels among said plurality of stationary and moving digitized communications platforms; and said network simulation means combining a plurality of circuit, packet and asynchronus transfer mode switches and a plurality of net radios.

21. The method for realistic simulation of wireless information transport systems recited in claim 20, further comprising:

permitting the operator to modify said selection means database output and said driver data output, using said network simulation means, based on the possible scenarios encountered during simulation; and said network simulation means is plug-and-play compatible.

22. The method for realistic simulation of wireless information transport systems recited in claim 21, further comprising configuring said network simulation means to operate at a real-time speed, a faster than real-time speed and a near real-time speed.

23. The method for realistic simulation of wireless information transport systems recited in claim 22, further comprising:

said network simulation means having a Distributed Interactive Simulation (DIS) Interface structure;

said network simulation means having a DIS network for interoperability among said plurality of operators during simulation; and said DIS network complying with a plurality of underlying DIS performance requirements and a plurality of DIS protocols.

24. The method for realistic simulation of wireless information transport systems recited in claim 23, further comprising:

providing a plurality of simulation outputs from said network simulation means;

said plurality of simulation outputs include a plurality of network, behavior and grade of service outputs; and said plurality of simulation outputs further comprising a plurality of message transmission delays, a plurality of network-access delays, a plurality of intranetwork routing data, a plurality of internetwork routing data and a graphic display on said computer display means.

25. The method for realistic simulation of wireless information transport systems recited in claim 24, further comprising:

providing a plurality of realistic communications effects from said network simulation means for both stationary and on-the-move voice, data and imagery communications; and said plurality of realistic communications effects includes a plurality of terrain error bursts, a plurality of fading error bursts in both fixed and hopping frequencies and a plurality of combined error bursts and error burst impacts with countermeasures.

26. The method for realistic simulation of wireless information transport systems recited in claim 25, further comprising:

providing a plurality of Received Signal Strength (RSS) effects caused by error bursts in the digital bit stream due to both short and long-term variations of RSS from a channel error-burst model of said multipath modeling means; and said plurality of RSS effects includes a plurality of time rate RSS variations which increase with vehicle speed.

27. The method for realistic simulation of wireless information transport systems recited in claim 26, further comprising said network simulation means having a means for simulating radio attributes, a means for simulating countermeasure signals, a means for simulating platform environment, a propagation variability means and a noise variability means.

28. The method for realistic simulation of wireless information transport systems recited in claim 27, further comprising:

computing a plurality of error-burst effects, a plurality of link margins and a plurality of terrain-shadowing effects combined with a plurality of multipath effects in real-time in said multipath modeling means;

simulating within said ITEMM software program a plurality of real-time, link-level communications impairments for voice or data bytes transported over said digital radio model; and said plurality of real-time, link-level communications impairments include error bursts, signal fades, signal propagation interference due to terrain shadowing, destructive multipath effects and moving platforms.

29. The method for realistic simulation of wireless information transport systems recited in claim 28, further comprising displaying a pictorial representation of link connectivity to the operator on said display means.

30. The method for realistic simulation of wireless information transport systems recited in claim 29, wherein said network simulation means, said channel error-burst model, said digital radio model and said multipath modeling means are computer programs.

31. The method for realistic simulation of wireless information transport systems recited in claim 30, wherein said network simulation means is a Real-Time Communications Network Simulator (RTCNS); and said multipath modeling means is an Integrated Terrain-Environment Multipath Model (ITEMM).

32. The method for realistic simulation of wireless information transport systems recited in claim 19, wherein said terrain map background is provided by a Terrain-Integrated Rough Earth Model of said multipath modeling means.

* * * * *